US010751664B2

(12) United States Patent
Higgins et al.

(10) Patent No.: US 10,751,664 B2
(45) Date of Patent: Aug. 25, 2020

(54) ENERGY-EFFICIENT EXTRACTION OF ACID GAS FROM FLUE GASES

(71) Applicant: Virginia Tech Intellectual Properties, Inc., Blacksburg, VA (US)

(72) Inventors: Stuart J. Higgins, Charlottesville, VA (US); Yih-An Liu, Blacksburg, VA (US); Yueying Yu, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 554 days.

(21) Appl. No.: 15/316,732

(22) PCT Filed: Jun. 5, 2015

(86) PCT No.: PCT/US2015/034584
§ 371 (c)(1),
(2) Date: Dec. 6, 2016

(87) PCT Pub. No.: WO2015/188166
PCT Pub. Date: Dec. 10, 2015

(65) Prior Publication Data
US 2017/0197175 A1    Jul. 13, 2017

Related U.S. Application Data

(60) Provisional application No. 62/008,587, filed on Jun. 6, 2014.

(51) Int. Cl.
*B01D 19/00* (2006.01)
*B01D 53/14* (2006.01)
*F28C 1/00* (2006.01)

(52) U.S. Cl.
CPC ..... *B01D 53/1475* (2013.01); *B01D 53/1425* (2013.01); *B01D 53/1462* (2013.01);
(Continued)

(58) Field of Classification Search
CPC .......... B01D 2252/20405; B01D 2252/20421; B01D 2252/20431; B01D 2252/20484;
(Continued)

(56) References Cited

U.S. PATENT DOCUMENTS 1,783,901 A    12/1930  Bottoms
4,452,763 A *   6/1984  van de Kraats ... B01D 53/1425
                                                      423/220
(Continued)

FOREIGN PATENT DOCUMENTS

EP    0637727 A2 *   2/1995  .......... B01J 19/2485
EP    0637727 A2     2/1995
GB    1589231 A      5/1981

OTHER PUBLICATIONS

United States International Searching Authority; International Search Report & Written Opinion for PCT/US2015/034584 dated Dec. 28, 2015; 18 pages; US.

*Primary Examiner* — Cabrena Holecek
(74) *Attorney, Agent, or Firm* — Keith A. Vogt; Keith Vogt, Ltd.

(57) ABSTRACT

An energy-efficient method of removing carbon dioxide, hydrogen sulfide, and other acid gases from a stream of flue gases. The flue stream is contacted with a predetermined sorbent system to remove acid gases from the flue stream. The acid gas-rich sorbent is then heated to desorb the acid gas for capture and regenerate the sorbent. Heat exchangers and heat pumps are used to reduce utility steam and/or cooling water consumption.

9 Claims, 12 Drawing Sheets

(52) U.S. Cl.
CPC ............ *B01D 2252/20405* (2013.01); *B01D 2252/20421* (2013.01); *B01D 2252/20431* (2013.01); *B01D 2252/20484* (2013.01); *B01D 2252/20489* (2013.01); *B01D 2252/504* (2013.01); *B01D 2257/304* (2013.01); *B01D 2257/504* (2013.01); *B01D 2259/652* (2013.01); *Y02C 10/06* (2013.01)

(58) Field of Classification Search
CPC .... B01D 2252/20489; B01D 2252/504; B01D 2257/304; B01D 2257/504; B01D 2259/652; B01D 53/1425; B01D 53/1462; B01D 53/1475; Y02C 10/06
See application file for complete search history.

(56) References Cited

U.S. PATENT DOCUMENTS

| | | |
|---|---|---|
| 2006/0032377 A1 | 2/2006 | Reddy et al. |
| 2008/0197058 A1 | 8/2008 | Kenny et al. |
| 2010/0115960 A1 | 5/2010 | Brautsch et al. |
| 2014/0017622 A1* | 1/2014 | Chen .................. B01D 19/0005 432/29 |

* cited by examiner

ENERGY-EFFICIENT EXTRACTION OF ACID GAS FROM FLUE GASES

RELATED APPLICATIONS

This application claims the benefit of U.S. Provisional Application No. 62/008,587 filed Jun. 6, 2014 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

The present invention is in the technical field of process engineering. More particularly, the invention concerns capturing acid gases such as from a flue gas stream. There are well-known environmental or regulatory reasons for industrial operations to reduce their emissions of acid gases such as $CO_2$ or $H_2S$.

A method for removing acid gas has been known since at least 1926, though this apparently original process did not regenerate the sorbent. A method for removing acid that incorporates sorbent regeneration has also been known since at least 1930 and is shown in U.S. Pat. No. 1,783,901.

While functional, early methods for acid gas capture suffered from excessive energy consumption. Much subsequent literature and many efforts have focused on reducing this energy consumption. The first approach to reducing energy consumption would be heat integration through the addition of heat exchangers. The central cross heat exchanger, which exchanges heat between the unloaded and loaded sorbent streams is a common staple present in most processes.

The general process of heat integration can be extended through the incorporation of heat pumps. An absorption-driven aqueous lithium bromide heat pump was integrated with an acid gas capture system in 1982. Other efforts have considered different types of heat pumps and methods for implementing them.

Process simulation software such as AspenTech's Aspen Plus V8.5 (Aspen Technology, Inc., Bedford, Mass.) can be used to design and assess the merits of various designs. Process simulators typically rely on iterative numerical methods. Simulations may require excessively long time spans, diverge, or otherwise fail to converge, making the process of finding a solution nontrivial. It is often necessary to build simulations up from simpler cases to avoid divergence or an undesired solution to systems with multiple solutions.

The primary goal of a capture system can be quantified by the capture rate, $$R = \frac{CO_2 \text{ captured}}{CO_2 \text{ in flue gas}}$$

Target capture rates for the present invention range from 80% to 95%, and preferably range from 75%-99%. Energy optimization is often quantified in terms of one or more of the following: regeneration energies; energy penalty; and equivalent work. Regeneration energy can be described in terms of thermal and electrical consumption per tonne of $CO_2$ captured, $$E_t^{regen} \equiv \frac{\sum_{\forall\text{utility heat}\atop\text{consumers i}} D_i}{F_{captured\ CO_2}} \text{ and } E_e^{regen} \equiv \frac{\sum_{\forall\text{electricity}\atop\text{consumers i}} B_i}{F_{captured\ CO_2}}$$

where $E_t^{regen}$ is the thermal regeneration energy; $E_e^{regen}$ is the electrical regeneration energy; $D_i$ is the heat duty of unit i; $B_i$ is the electrical consumption of unit i; and $F_{capture\ CO_2}$ is the material flow rate of $CO_2$ in the flue gas.

Generally, the primary contribution to $E_t^{regen}$ comes from the regeneration tower's one or more reboilers while the primary contribution to $E_e^{regen}$ comes from the one or more compression units which may be compression trains.

There are two commonly used definitions for energy penalty. First is the production-loss energy penalty $EP_{PROD-loss}$, defined as the portion of a power plant's energy production lost when a CCS system is installed. The second is the size-up energy penalty $EP_{size-up}$, defined as the factor by which a power plant must be sized up to still produce the same amount of electricity after a CCS unit is installed.

Energy penalties can be calculated as $$EP_{prod-loss} \equiv 1 - \frac{\eta_{with\ CCS}^{plant}}{\eta_{w/o\ CCS}^{plant}}$$

$$= R\varepsilon_e^{CCS}\left(E_e^{regen} + \sum_{\forall\text{steam sinks i}} \eta_i^{steam} E_{t,i}^{regen}\right)$$

and $$EP_{size-up} \equiv \frac{\eta_{w/o\ CCS}^{plant}}{\eta_{with\ CCS}^{plant}} - 1 = \frac{EP_{prod-loss}}{1 - EP_{prod-loss}}$$

where $\eta_i^{plant}$ (i=reference plant with or without CCS) is the ratio of net electrical energy output of plant i to the thermal energy it obtains by burning fuel; $\eta_i^{steam}$ the ratio of electrical energy obtainable to the thermal energy used for steam i; and $\varepsilon_e^{CO_2}$ is the thermal emission rate: the mass flow rate of $CO_2$ emitted per unit of thermal energy produced by burning fuel in the base case plant.

The plant-specific factors $\eta_{ref}$ and $\varepsilon_e^{CO_2}$ can vary widely between different power plants.

BRIEF SUMMARY OF THE INVENTION

In one embodiment, the present invention provides a system and methodology for creating optimized energy-saving and/or energy-efficient designs of acid gas capture systems as well as acid gas capture designs created by these systems and methodologies.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
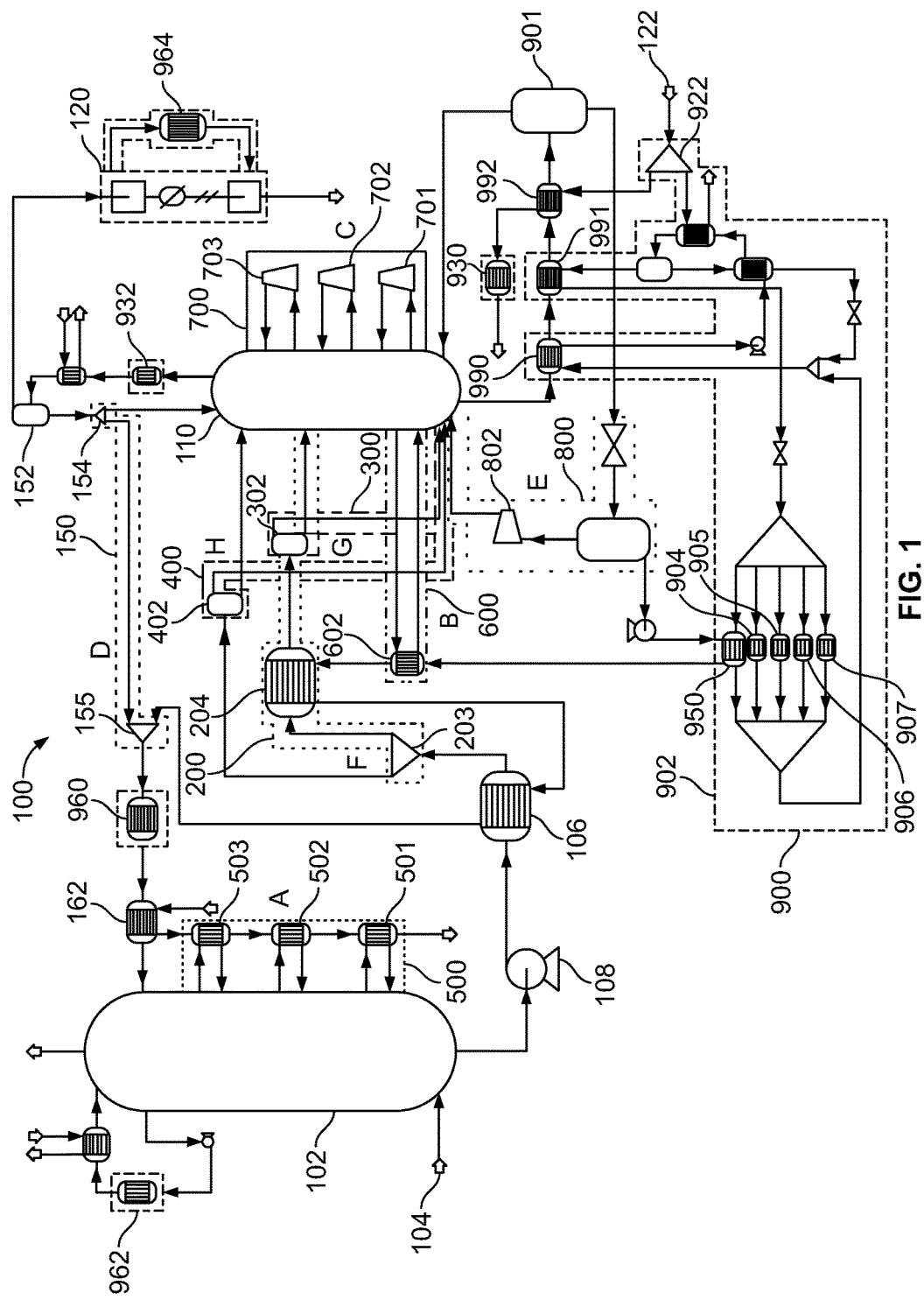
FIG. 1 depicts an embodiment of the present invention.

FIG. 1 illustrates a preferred embodiment of the present invention. System 100 includes a combination of components that are well known in the art and a number of systems that are part of the present invention that improve the efficiency of the basic design.

The basic apparatus for separating an acidic gas from a gaseous mixture containing the same includes an absorber 102 adapted to receive an acidic gas mixture 104. The absorber is adapted to contact the acidic gas mixture with a lean solution of sorbent to remove the acidic gases from the mixture to create an acidic gas rich solution sorbent that is sent to cross heat exchanger 106 by pump 108. Cross heat exchanger 106 is in communication with absorber 102 and a stripper or regenerator 110. The system is adapted to heat the acidic gas rich solution of sorbent and to cool a lean solution of sorbent. Regenerator 110 is in communication with absorber 102. Regenerator 110 is adapted to desorb the acidic gas from the acidic gas rich solution of sorbent for capture by system 120 and to regenerate a lean solution of sorbent that is directed to absorber 102 for reuse. Utility heat or steam 122 supplies heat to regenerator 110 to perform desorption.

In one embodiment of the present invention, system 150 (D) may be added to the basic design to increase performance. System 150 (D) provides vapor condensate rerouting. Vapor condensate rerouting is an energy-saving scheme that saves about 0.5% on utility steam and in certain preferred embodiments, saves about 2.0% on utility steam. Vapor condensate rerouting may be accomplished by splitting vapor condensate obtained from condenser 152 with a splitter 154. A portion of the vapor condensate is sent to regenerator 110 and another portion is sent to combiner 155 that is in communication with cross heat exchanger 106. The combined stream of lean sorbent from the heat exchanger and regenerator condensate is sent to one or more heat exchangers 162 before the lean solution is transferred to absorber 102. In addition, the splitter may be adjustable so as to allow more flow to regenerator 110 during start up and less as the system comes on line.

In other embodiments of the present invention, systems 200, 300 and 400 may be added to the basic design to increase performance. System 200 (F) provides a distributed cross heat exchanger, without vapor rerouting. As shown, cross heat exchanger 106 is in communication with splitter 203, which, in turn, is in communication with heat exchanger 204. Splitter 203 may be adjustable so as to direct energy where needed by the system.

System 300 (G) provides a flash drum 302 that splits the fluid into vapor (upper) and liquid (lower). In a preferred embodiment, flash drum 302 sends about 70% of the vapor to the top portion of regenerator 110 and 30% to the bottom portion of regenerator 110. System 300 provides mid-stream vapor rerouting for the distributed cross heat exchanger 204. Systems 200 and 300 may be implemented when the mid-feed stream has significant vaporization.

In other embodiments, the primary material splitting for the system may be done at the splitter 203. Splitter 203 routes 30% of the material (mostly liquid, but potentially some vapor) to the route that will ultimately take it to the top of the regenerator. The splitter reroutes the remaining 70% of the material to the route that will ultimately take it to the mid point on the regenerator. The 70% of material split to the mid pointed is heated further (in HEX "204") before being put into the mid point on the regenerator. This heating may cause the mostly-liquid solution to boil more, generating vapor. In some embodiments, 30% of material is sent to the top of the regenerator and 70% is sent to the middle portion of the regenerator.

However, if systems 300 and 400 are added, the ratios of the splits are further sub-divided into vapor and liquid. All liquid goes on as normal, but any vapor in a stream with a flash (top stream if system 400 and mid stream if system 300) is instead put into the bottom of the regenerator. In embodiments in which system 300 is implemented, almost all of the vapor goes to the bottom of the regenerator.

System 400 (H) provides a flash drum 402 that provides top-stream vapor rerouting for distributed cross heat exchanger 106. In a preferred embodiment, flash drum 402 sends about 70% of the vapor to the top portion of regenerator 110 and 30% to the bottom portion. Systems 200 and 400 may be implemented when the top-feed stream has significant vaporization.

Systems 200, 300 and 400 may also be combined when both mid-feed and top-feed streams have significant vaporization. This embodiment is useful in applications that aggressively seek energy efficiency.

In other embodiments, system 500 (A) provides absorber 102 intercooling. As shown, one or more side heat exchangers 501-503 are in communication with absorber 102. The one or more side heat exchangers are adapted to receive a desired sorbent such as an acidic gas solution of sorbent from absorber 102 and to cool the acidic gas rich solution of sorbent prior to returning the cooled acidic gas rich solution of sorbent to absorber 102.

In other embodiments, regenerator interheating is provided by system 600 (B). System 600 includes one or more side heat exchangers 602 that are in communication with stripper or regenerator 110. The one or more side heat exchangers are adapted to receive a lean solution of sorbent from the regenerator and to cool the lean solution of sorbent prior to returning the lean solution of sorbent to the regenerator.

In other embodiments, regenerator interheating is used since the absorber needs to be cold to work and the regenerator needs to be hot to work. Hot liquid from the regenerator may flow into the absorber. In one aspect, the present invention concerns an improvement over prior designs by using a heat exchanger to obtain heat from the liquid and transfers the heat to the regenerator.

In other embodiments, one or more side exchangers may be used to warm the sorbent inside of the regenerator. This has the side-effect of cooling the sorbent which just came out of the bottom of the regenerator.

In other embodiments, system 700 provides a multi-pressure regenerator (C). The multi-pressure regenerator has one or more side compressors 701-703, yet a full design may consider one at regular intervals on regenerator 110. Each compressor may be accompanied by internal pressure segregation inside of regenerator 110. The one or more compressors 701-703 are adapted to move gas located in regenerator 110 from a lower pressure section to a higher pressure section.

In other embodiments, system 800 provides vapor recompression (E). System 800 includes at least one compressor 802, which, when combined with a multi-pressure regenerator, allows the regenerator's bottoms to be flashed down to pressures matching each of the upper sections, in series.

For embodiments of the present invention using one or more compressors, the system is designed for the regenerator to let out a liquid stream from its bottom. The bottom stream is flashed to a lower pressure, which causes some of the liquid to become vapor. The liquid and vapor may then be split. The liquid portion is sent along its normal path, which ultimately leads to the absorber. The vapor is sent to the regenerator. However, because the regenerator is at a higher pressure, the vapor needs to be compressed.

For embodiments using multi-pressure stripping or regeneration, the regenerator has two or more regions of differing pressure. Since the bottom of the regenerator is always the highest, the liquid at the bottoms starts at that high pressure. It's iteratively flashed down to each of the lower pressures, with that steam from each flash being fed into the section of the regenerator at that pressure without compression leaving a liquid at the lowest pressure. This can be flashed down further to yet lower pressures (if not already at atmospheric pressure). Resulting vapor still goes into the regenerator, but since it's too low pressure to do so, it is first compressed.

In other embodiments, system 900 combines a traditional heat pump system 902 with reboiler 901 to heat the sorbent processed by regenerator 110. System 900 includes waste heat receivers 904-907 wherein low-quality heat enters the heat pump 902 through the waste heat receivers. Received waste heat may come from the gas-capture process and/or outside sources. Full-waste heat can be consumed without detriment to the source, and its use is preferred. Semi-waste heat is available for consumption, though its consumption comes with some detriment.

Waste heat receivers 904-907 correspond to waste heat sources. The number of receivers used may vary depending upon the application.

In yet another preferred embodiment, semi-waste heat receiver 950 is provided. As shown, semi-waste heat receiver 950 may receive semi-waste heat from reboiler 901. In other embodiments, there may be more than one semi-waste heat receiver to receive semi-waste heat from other locations inside and/or outside of the process.

In general, heat (thermal energy) is carried from one or more waste heat sources, through the waste heat emitters, and into heat pump 902. A potential source for waste heat is reboiler 901. Reboiler 901 is heated by condensing high-temperature steam into high-temperature liquid water. Useful waste heat may be extracted from this condensate by using a heat-exchanging surface 930 to make it a waste heat emitter.

Another potential source for waste heat is the vapor leaving the top of regenerator 110, which is generally cooled in the regenerator's condenser. Heat pump 902 may be configured to provide cooling to the vapor by waste heat emitter 932. Using waste heat emitter 932 provides two benefits: 1) waste heat for the heat pump and 2) cooling to the condenser (which reduces the amount of cooling water needed for it to do its job). In general, waste heat emitter 932 draws heat from the vapor before the remaining vapor reaches the condenser.

Yet another potential source for waste heat is lean sorbent cooler 162. Waste heat emitter 960 may be used to capture this energy. Since an absorber should not be too hot, to keep its temperature down, sorbent is generally cooled before entering. The lean sorbent cooler 162 uses cooling water to cool the sorbent. Waste heat from this source may be extracted from the lean sorbent before it goes into the lean sorbent cooler using waste heat emitter 960.

Absorber vapor waste heat is another source of waste heat that may be captured by waste heat emitter 962. Emitter 962 may take two different forms since the absorber's vapor can be cooled in two different ways. First, emitter 962 may be located on the circulating wash liquid. In some applications, instead of using a condenser, the vapor stream is washed before leaving the tower. This is like the absorption happening in the bottom of the tower, except the wash is primarily cold water. The purpose of the cold water is to cool/dry the outgoing vapor, like a condenser would, just in a different way. Second, when a condenser is used, the absorber's top looks like the regenerator's top and emitter 962 may be in communication with absorber 102 to capture available waste heat.

Recovered gas compression waste heat emitter 964 may also be used. Once a gas is captured, it is compressed, which generates heat. Cooling water is often used to compensate. Instead, waste heat emitter 964 may be used to perform this operation and provide heat to heat pump 902.

As also shown, splitter 922 may be used to provide utility steam to both heat pump 902 and reboiler 901. The splitter may be adjustable so as to allow the reboiler to receive more energy from utility steam during system start up and less as energy from heat pump 902 becomes available. In some embodiments to supply energy to regenerator 110, heat pump 902, through one or more heat exchangers 990-991, may supply some of the energy to regenerator 110 in combination with heat exchanger 992, which is communication with the utility steam. In other embodiments, the system transitions from utility steam to partially using energy from heat pump 902. In yet other embodiments, heat pump 902 provides all or a substantial portion of the necessary energy to regenerator 110.

In an alternative embodiment, one or more heat pumps may provide energy to regenerator 110 through useful heat emitters acting on streams within or feeding the regenerator. In addition, the heat pumps may be configured to deliver energy to mid-feed streams on the regenerator.

In a preferred embodiment, one or more heat pumps deliver energy to material within one or more of the regenerators at relatively cool yet low points, e.g. just above a warm feed, reboiler, as well as other heat pumps' useful heat emitters. Heat delivery can be done within regenerators or by acting on streams feeding into regenerators, including draws and return streams. Preferably, but not necessarily, the vapor generated due to delivered heating is redirected to a lower point in a regenerator.

In other embodiments, the present invention provides one or more heat pump reboilers at other locations on the regenerator. Preferably, (but not necessarily) the vapor from the reboilers is redirected to the bottom of the regenerator (or, if deployed in conjunction with the multi-pressure configuration, to the bottom of the pressure section which the heat pump operates on). Locations for heat receivers to be used with the various embodiments described herein may be located at material feeds into regenerators and/or at the regenerators either directly or through side draws.

In an alternative embodiment, splitter 922 is replaced by using two separate streams of utility stream. This would be preferable for cases in which the design employs differing temperatures of steam or otherwise calls for steam from multiple sources.

In other embodiments, the heat emitters act on waste heat streams located along the side of absorber 102 and emitters associated with any compressor or pump used with the system. In other embodiments, the heat emitters act on streams within or feeding the regenerator. The system may also be designed to use heat emitters that act on waste heat streams and on streams within or feeding the regenerator.

In a further preferred embodiment, the present invention provides a method of design that is conducted in an environment capable of simulating unit operations. In another preferred embodiment, the present invention uses a process engineering simulator such as AspenPlus, HYSYS, Chem-Sep, or DWSIM. Other possible environments include mathematical software such as Matlab, Mathematica, Maple, or Engineering Equation Solver; spreadsheet environments such as Microsoft Excel, OpenOffice.org Calc, Google Docs, and LibreOffice Calc; and programming environments, such as those for Fortran, C, C++, C#, Objective-C, Java, Pascal, Lisp, PHP, Python, Perl, Ruby, JavaScript, Basic, Visual Basic, F#, R, COBOL, and Assembly.

In yet another embodiment, the method of design of the present invention begins with the basic acid gas capture system described above. An embodiment of this invention may then be used to improve the basic system.

An acid gas system under design may be generalized with the inclusion of one or more heat exchangers as shown in FIG. 1. Each additional energy-saving scheme is tied to design parameters, such as the heat-exchanging surface area of a cross heat exchanger $A_i$ or the split fraction of a material stream splitter $X_i$. These design parameters may then be optimized.

Certain optimization results will cause the design to reduce to a less generalized version. For example, a process generalized to include regenerator interheating reduces to a process without regenerator interheating when the interheating heat exchanger is found to have a heat exchanging surface area of zero, $A_{STR-IH}=0$. For another exchanger, a process including the distributed cross heat exchanger reduces to a process without cross heat exchanger distribution when the material split fraction of the rich sorbent stream splitter is optimized to zero.

Specific generalizations include: cross heat exchanger; regenerator condensate rerouting; heat pump integration; regenerator interheating; simple rich sorbent heat recovery; distributed rich sorbent heat recovery; and absorber intercooling.

A preferred embodiment of this invention performs one or more of these generalizations and optimizations to arrive at a design for an acid gas capture system that improves the performance of the system, where preference is expressed through the selection of the evaluation functions used during optimization.

Methodology Overview

An embodiment of the invention begins with just a single absorption tower and then builds more complex simulations. An embodiment of this invention for the initialization of simulations begins with a simple absorption tower composed of packed and/or trayed sections. The addition of a tower's condenser, reboiler, wash tower, or any other associated units may be delayed until after satisfactory convergence is obtained for the packed and/or trayed regions within the column. A preferred embodiment of this invention first provides an absorption tower, then designs a downstream regeneration tower, and finally closes the loop between the absorption tower and regeneration tower.

An embodiment of this invention begins with an acid gas capture system, which then adds various splits from feeds into the columns along with heat exchangers throughout the process. These material stream splits start with zero flow rates and the heat exchangers start with zero surface areas. Both are then optimized, preferably either iteratively or simultaneously.

An embodiment of this invention begins from a viable simulation for an acid gas capture system, then considers a heat pump before each heater present in the system, such as the regeneration tower's reboiler. A heat pump is designed such that it delivers heat of sufficient temperature to that stream before the in-system heater. The heat pump is considered to draw waste heat from material streams just before entering coolers. The heat pump is considered to draw sufficient utility heating or utility work as needed.

Algorithm for Solving the Simple Problem

An embodiment of this invention begins with a simple model of absorption tower 102 as shown in FIG. 1. The unloaded sorbent flow rate is initially estimated such that the loading potential of the unloaded sorbent is just sufficient to absorb the desired capture portion of the acid gas from the flue gas. It is recommended, but not necessary, for this problem to be first solved using an equilibrium-based model for the absorption tower, then the solution of the equilibrium-based model is used as an initial estimate for the rate-based model.

Next the method defines the concept of the effective capture rate in the absorption tower $\mathcal{R}_{abs}$ $$\mathcal{R}_{abs} \equiv 1 - \frac{f_{acid\ gas\ component\ in\ treated\ gas\ stream}}{f_{acid\ gas\ component\ in\ flue\ gas\ stream}},$$

where $f_i$ is the mass or mole flow rate of i, and the effective capture rate in the regeneration tower $\mathcal{R}_{reg}$ $$\mathcal{R}_{reg} \equiv \frac{f_{acid\ gas\ component\ in\ capture\ stream}}{f_{acid\ gas\ component\ in\ flue\ gas\ stream}},$$

noting that, at steady state, $$R = \mathcal{R}_{abs} = \mathcal{R}_{reg}$$

as can be proven by material balance on the $CO_2$ flows within the process.

Next this model is considered to be a function of the absorption tower which finds the effective capture rate for the absorption tower $\mathcal{R}_{abs}$ $$\mathcal{R}_{abs}(\phi) = \mathcal{R}_{abs}\left(\begin{bmatrix} \begin{bmatrix} T_u \\ H_u \\ f_u \\ x_{u_1} \\ \vdots \\ x_{u_{N_u}} \\ T_f \\ H_f \\ f_f \\ x_{f_1} \\ \vdots \\ x_{f_{N_f}} \end{bmatrix} \end{bmatrix}\right),$$

Where $\phi$ is the column vector describing the input streams; $T_i$ is the temperature of material stream i; $H_i$ is the enthalpy of material stream i; $f_i$ is the mole flow rate of material stream i; $x_{i,j}$ is the mole fraction of component j in material stream i; $N_i$ is the number of chemical components in material stream i; u is the subscript indexing the unloaded sorbent stream; and f is the subscript indexing the flue gas stream.

Then a root-finding algorithm can be applied to find the $f_u$ element of $\phi$ such that $\mathcal{R}_{abs} - R_{target} = 0$ where the treat gas is tentatively considered to be the vapor stream coming from the top of the absorption tower. Alternatively, an optimization algorithm can be used to minimize $(\mathcal{R}_{abs} - R_{target})^2$.

Example algorithms used include Newton's method and quasi-Newtonian methods such as the secant method and the Marquardt method. Alternatively a simple convergence algorithm can be used, such as $$\frac{f'_u}{f_u} = \frac{R_{target}}{\mathcal{R}_{abs}}$$

or $$\frac{f'_u}{f_u} = 1 + \frac{R_{target} - \mathcal{R}_{abs}}{R_{target}},$$

where $f_u$ is the mole flow rate of the unloaded sorbent stream and $f'_u$ is the mole flow rate of the unloaded sorbent to use in the next iteration.

Hereafter it should be understood that root-finding algorithms, least-squared, or other alternative approach is used to achieve target design values.

Next the absorption tower may be coupled with a wash tower. Optionally, the wash tower may be represented with a condenser or other flash equilibrium unit. The conditions within the wash tower or its proxy may be determined by another iterative method if the conditions are defined by some other process objective such acceptable loss of sorbent through the treated gas stream. For example, sorbent is usually lost through the treated gas stream, but this can be controlled by adjusting the temperature of a condenser or wash tower to condense more sorbent from the treated gas stream, returning it to the process. Otherwise simple conditions such as a temperature and pressure may be defined for it.

The numerical solver is again applied as before to find $f_u$ such that $\mathcal{R}_{abs} \rightarrow R_{target}$, though the treated gas stream is now considered to be that coming from the top of the wash tower or its proxy as opposed to that the vapor stream directly from the absorption tower.

If the proxy was used, then the wash tower may now be substituted. It is recommended, though not necessary, to first use an equilibrium-based model for the wash tower. The wash tower and its associated unit operations are isolated within their own solution scheme. First a reasonable value is selected for the stream containing cooled wash to enter the top of the wash tower with its temperature set such that it is somewhat lower than the temperature determined to be appropriate for the proxy wash tower to meet any objectives. Then a convergence loop is established for the side cooler such that this temperature is reached with a constant surface area heat exchanger and a variable coolant flow rate. Then the wash flow rate within the wash tower is selected with the bottoms stream splitter returning the appropriate amount of wash to the top of the wash tower, with the balance of wash being returned to the absorption tower. The convergence loop for $\mathcal{R}_{abs}$ is again consulted to reach desired acid gas rate $R_{target}$.

Next another convergence loop is nested within about the wash tower which seeks to solve $$f_{wash} - f_{target} = 0,$$

where $f_i$ is the fractional approach to flooding within column i. The column diameter or related tower property is modified until the desired fractional approach to flooding for columns is reached. Typically $$\phi_{\text{target}} = 0.75,$$

which is a 75% fractional approach to flooding. A similar convergence loop is nested around that seeking $\mathcal{R}_{\text{abs}} = R_{\text{target}}$ for $$\phi_{\text{abs}} - \phi_{\text{target}} = 0,$$

where the column diameter for the absorber or related tower property is modified until the desired fractional approach to flooding for columns is reached.

While within normal tower operation parameters, where neither weeping nor flooding is occurring, $$\phi_i \propto \frac{f_{i_{vapor}}}{D_i^2},$$

such that a reasonable guess for a next column diameter $D'_i$ is usually $$\frac{D'_i}{D_i} = \sqrt{\frac{\phi_i}{\phi_{\text{target}}}},$$

which may be used to converge the loop or to initialize for the secant method or other solution approach.

Once this initialization procedure has been completed, a single unit operation is constructed from: the absorption tower; the wash tower; the wash splitter; the wash pump; the wash heat exchanger; and all associated mathematical methods.

This single unit operation represents the absorption units of the acid gas capture system, where the desired acid gas capture rate, approaches to flooding, and sorbent loss are enforced by the selection of design parameters.

The regeneration tower section is then added to the model. An embodiment of this invention constructs this regeneration tower section piecewise as was done for the absorption tower section. Once the regeneration tower section has an initial convergence, the flow rate of the coolant for the regeneration tower's condenser is adjusted such that the cooler reaches the desired temperature. Another convergence loop may be used to adjust the desired temperature such that an output composition requirement is met.

Similarly the stream which heats the reboiler has its flow rate adjusted such that the target vapor fraction or heating duty is met by the reboiler. Then this target vapor fraction or heat duty is adjusted such that the effective acid gas capture rate for the regeneration tower $\mathcal{R}_{\text{reg}}$ approaches either $R_{\text{target}}$, or, preferably, $1 - \mathcal{R}_{\text{abs}}$. That $$\mathcal{R}_{abs} = \mathcal{R}_{reg}$$

implies $$1 - \frac{f_{treated\ gas_{acid\ gas}}}{f_{flue\ gas_{acid\ gas}}} = \frac{f_{captured_{acid\ gas}}}{f_{flue\ gas_{acid\ gas}}},$$

or $$f_{flue\ gas_{acid\ gas}} = f_{treated\ gas_{acid\ gas}} + f_{captured_{acid\ gas}},$$

proving that the acid gas material balance is satisfied.

Additionally the regeneration tower's approach to flooding may be brought to $\phi_{\text{target}}$, as $\phi_{\text{abs}}$ and $\phi_{\text{wash}}$ were, by adjusting the tower's diameter or related tower property. The relationship $$\frac{D'_{reg}}{D_{reg}} = \sqrt{\frac{\phi_{reg}}{\phi_{\text{target}}}}$$

also tends to hold and is the preferred calculation method for $D'_{reg}$ for the second iteration of the convergence loop seeking $\phi_{\text{ren}} = \phi_{\text{target}}$.

Next the unloaded sorbent stream coming from the bottom stream of the regeneration tower's reboiler is connected to the hot stream of the central cross heat exchanger, fixing the break. Hereafter a convergence loop including the regeneration tower and its associated units, as well as the central cross heat exchanger, is included in the overall methodology.

Figure 2A:
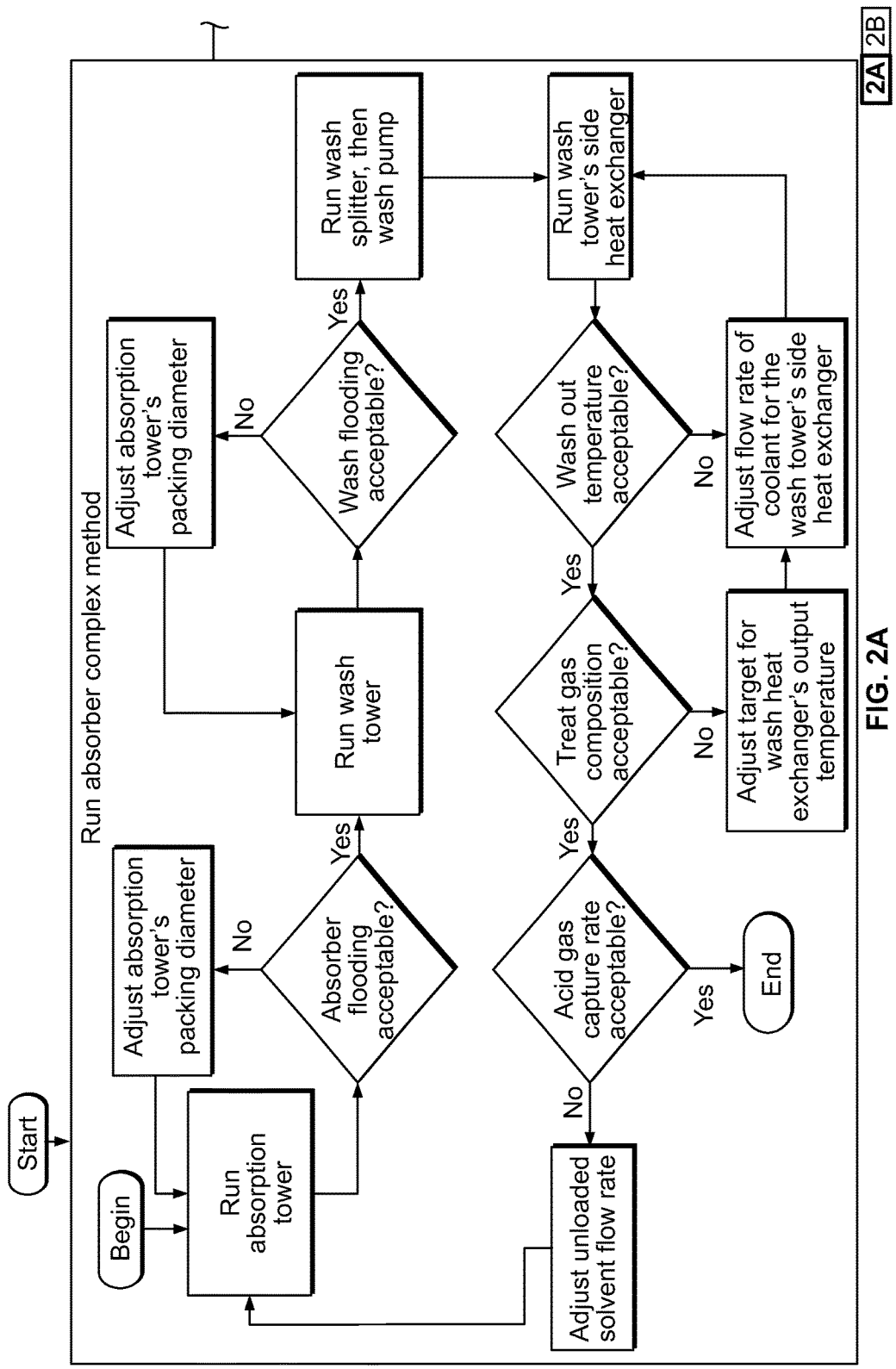
FIG. 2 is a flow chart of a simulation method for a baseline acid gas capture system.
Figure 2B:
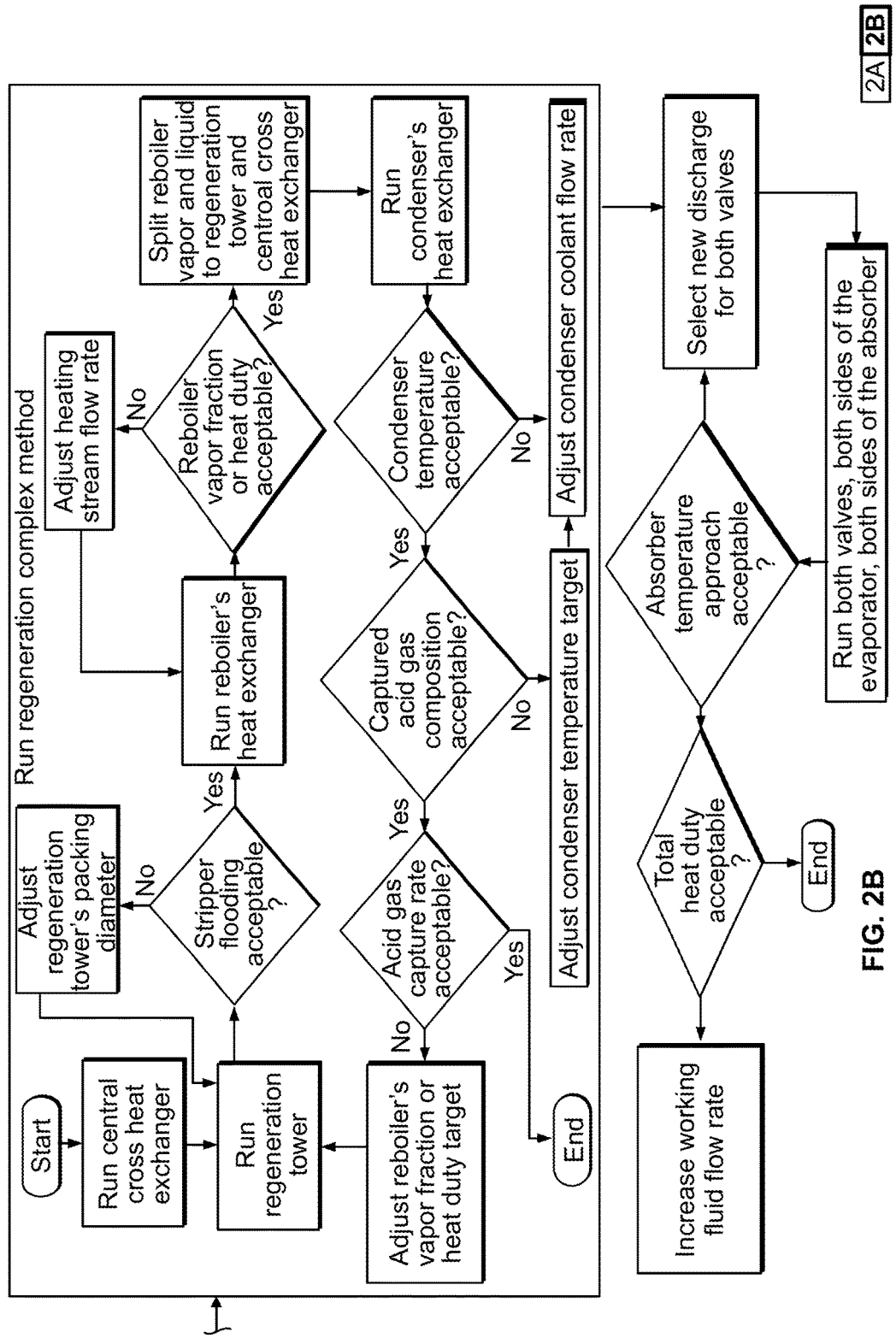

An embodiment of this invention also involves adjusting the simple regeneration column loop. With the algorithms for the simple absorption and regeneration systems established, the feedback from the regeneration complex to the absorption complex is now connected. The liquid condensate from the regeneration tower's condenser and the unloaded sorbent emerging from the central cross heat exchanger are combined in a mixer, cooled in a heat exchanger, and then cycled back for use as the unloaded sorbent. Additionally the acid gas compressor is added to the captured acid gas stream and a wash tower is added to the flue gas stream. An embodiment of this invention which solves for the simple acid gas capture system and finds the appropriate process parameters as shown in FIG. 2.

Optimization Approaches

Embodiments of this invention may employ one or more generalizations discussed in the Methodology Overview section. A preferred embodiment of this invention generalizes and expands the basic design to include multiple splits into the absorption tower and regeneration tower as well as many new heat exchanging surfaces, then optimizes the split fractions of the new split flows and the surface areas of the new heat exchangers. Then a heat pump is added before the conventional heater for the regeneration tower's reboiler and optimized.

Optimization Approach for Split Flow Fractions and Heat Exchanger Surface Areas

An embodiment of this invention uses a methodology like that discussed in the Algorithm for Solving the Simple Problem section to maintain a desired carbon capture rate, approach to flooding in the towers, outlet conditions, and sorbent composition by adjusting factors such as the sorbent flow rate, utility consumption, and heat exchanger size. This maintenance allows the process of the method to vary heat exchanger sizes and split fractions without changing the outcome of the process. It is a goal of the preferred embodiment of this invention to make these selections as to minimize cost.

Embodiments of this invention may use simple flash calculations in lieu of calculating heat exchanger parameters and utility usage while converging the underlying model. While this is the preferred approach for computational efficiency, the heat exchanger parameters and utilities may be needed for optimization in which case they should be calculated after the underlying model is converged but before optimization interacts with this underlying model.

The design process of optimization may begin by allotting a set amount of heat exchanger surface area for energy-saving heat exchangers, entirely assigning all of this surface area to the central cross heat exchanger. The process may then iteratively transfer a portion of that surface area to other heat exchangers in the process, accepting transfers which result in energy savings. This process is coupled with similar selections for split fractions of feeds entering a column. This process is continued until an optimal design for the selected heat exchanger surface area is found. This optimization may continue by allowing the total heat exchanger surface area to also vary.

Figure 3:
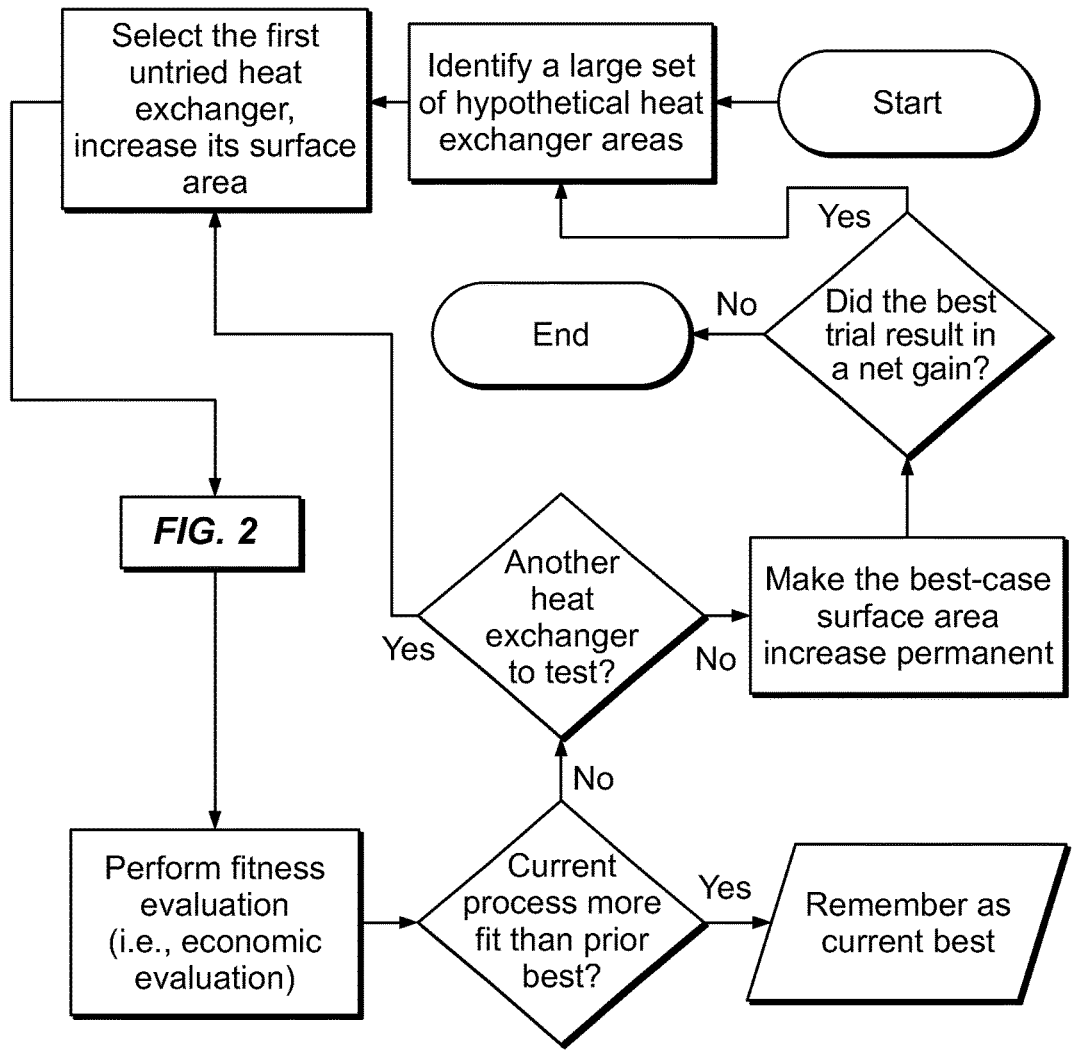
FIG. 3 is a flow chart of an optimization method for hypothetical heat exchanging surfaces in an acid gas capture system.

A variation of this optimization begins with little or no surface area allocated to heat exchangers, then iteratively adds small amounts of surface area to each heat exchanger until doing so no longer results in increased economic fitness. This methodology is shown in FIG. 3.

Figure 4:
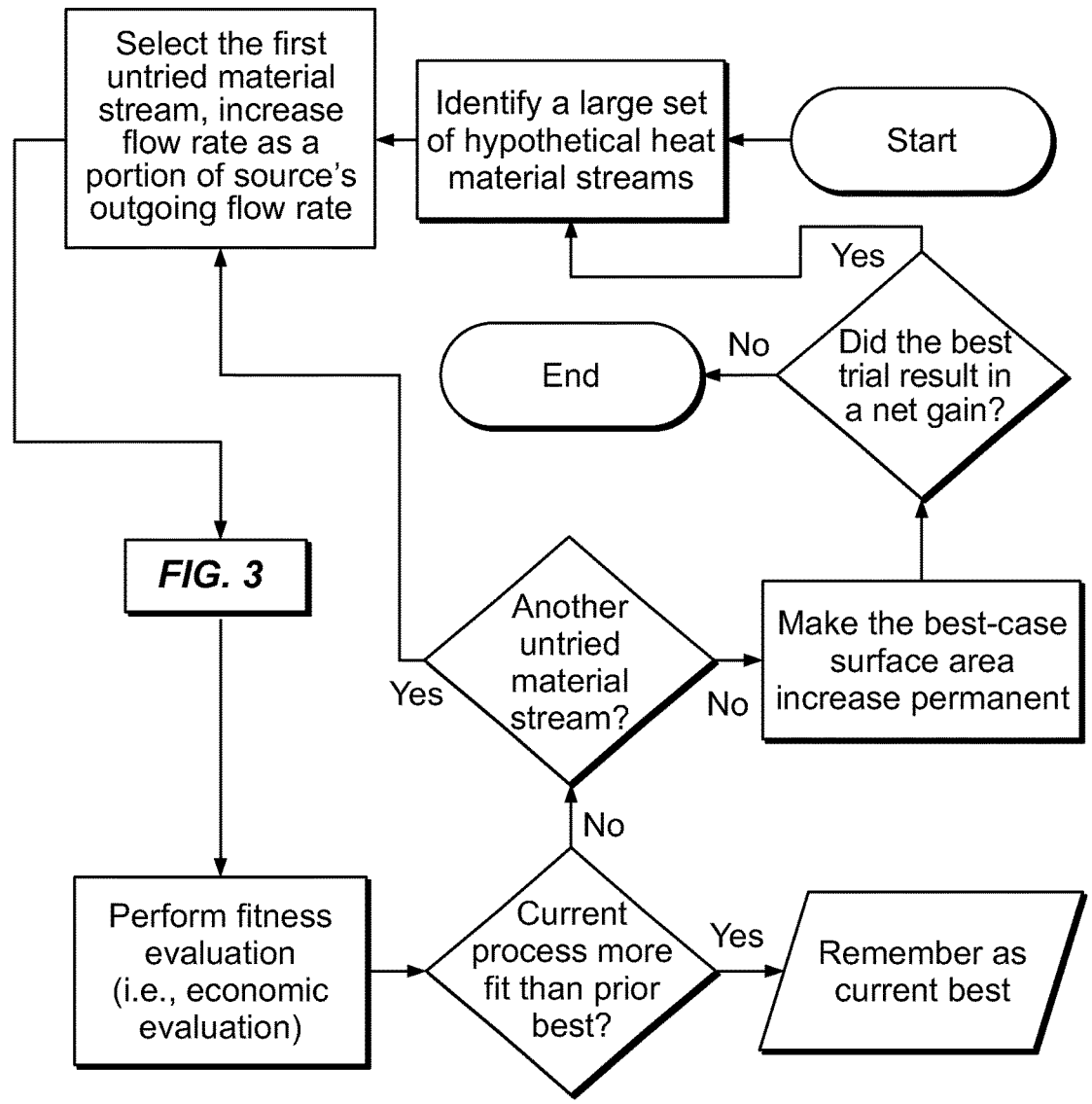
FIG. 4 is a flow chart of an optimization method for an acid gas capture system generalized to include hypothetical material streams.

Another optimization scheme allows for a large number of additional material streams to be connected throughout the process. These material streams each begin with a flow rate of zero. Optimization increases these flow rates from zero, accepting new values if the economic fitness has been increased. This scheme is shown in FIG. 4.

Algorithm for Modeling a Compression-Driven Heat Pump

A compression-based heat pump can be modeled as having two pressures, $P_{low}$ and $P_{high}$, where the evaporator operates at $P_{low}$ while the condenser operates at $P_{high}$. A simulator may model a compression-based heat pump where $P_{low}$ is selected to be the pressure at which the working fluid within the heat pump vaporizes at the minimum temperature approach within the evaporator's heat exchanger. Likewise $P_{high}$ may be selected to be the pressure at which the working fluid within the heat pump condenses at the minimum temperature approach within the condenser's heat exchanger. The flow rate may then be selected to increase the total effect of the heat pump.

Algorithm for Modeling an Absorption-Driven Heat Pump

Figure 5A:
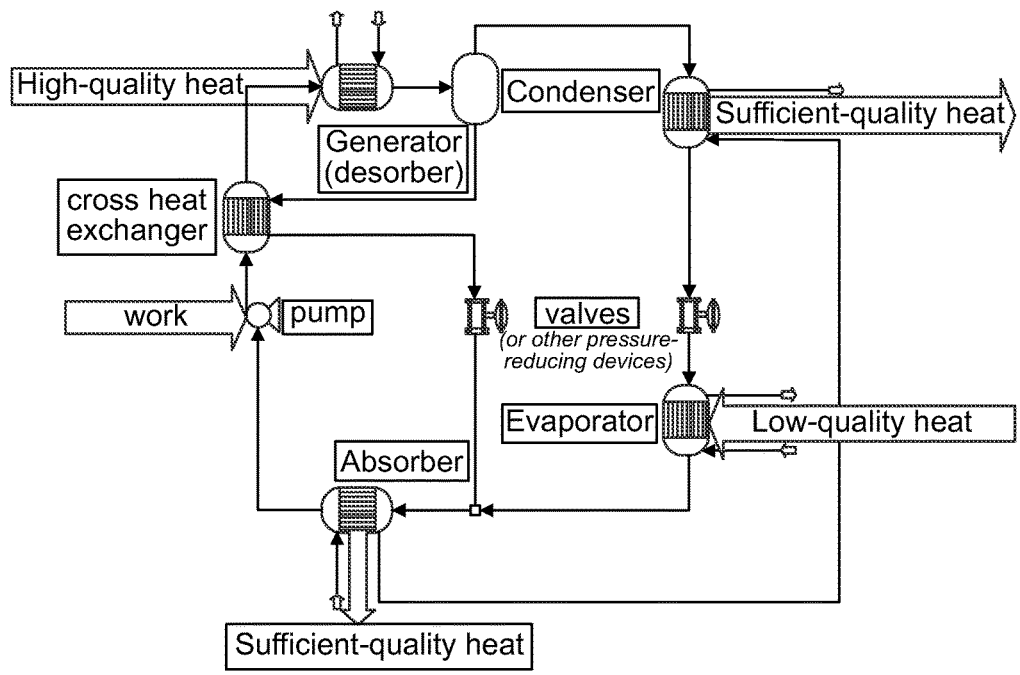
FIG. 5A is a flow sheet of an absorption-driven heat pump (single effect).
Figure 5B:
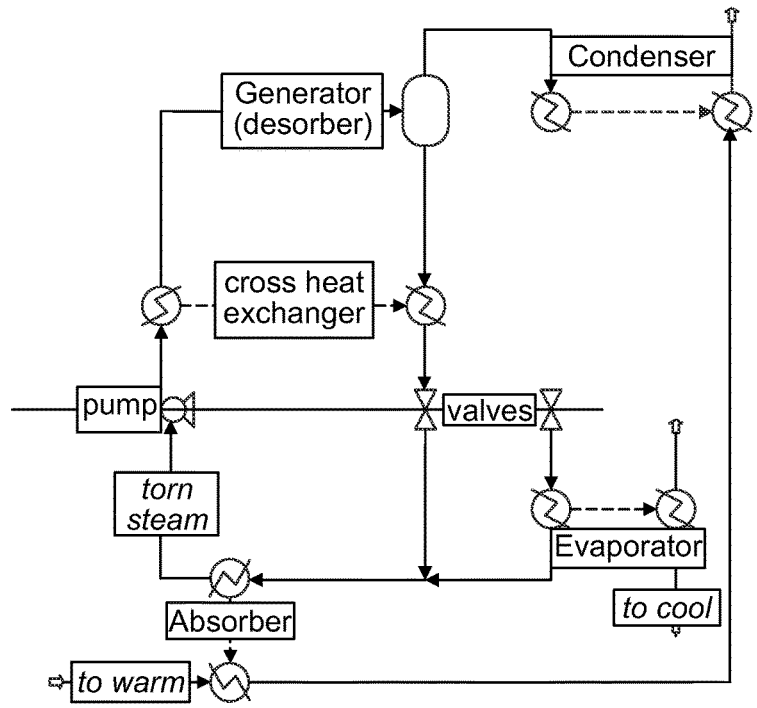
FIG. 5B is a flow sheet of an example simulation of an absorption-driven heat pump in Aspen Plus.
Figure 5C:
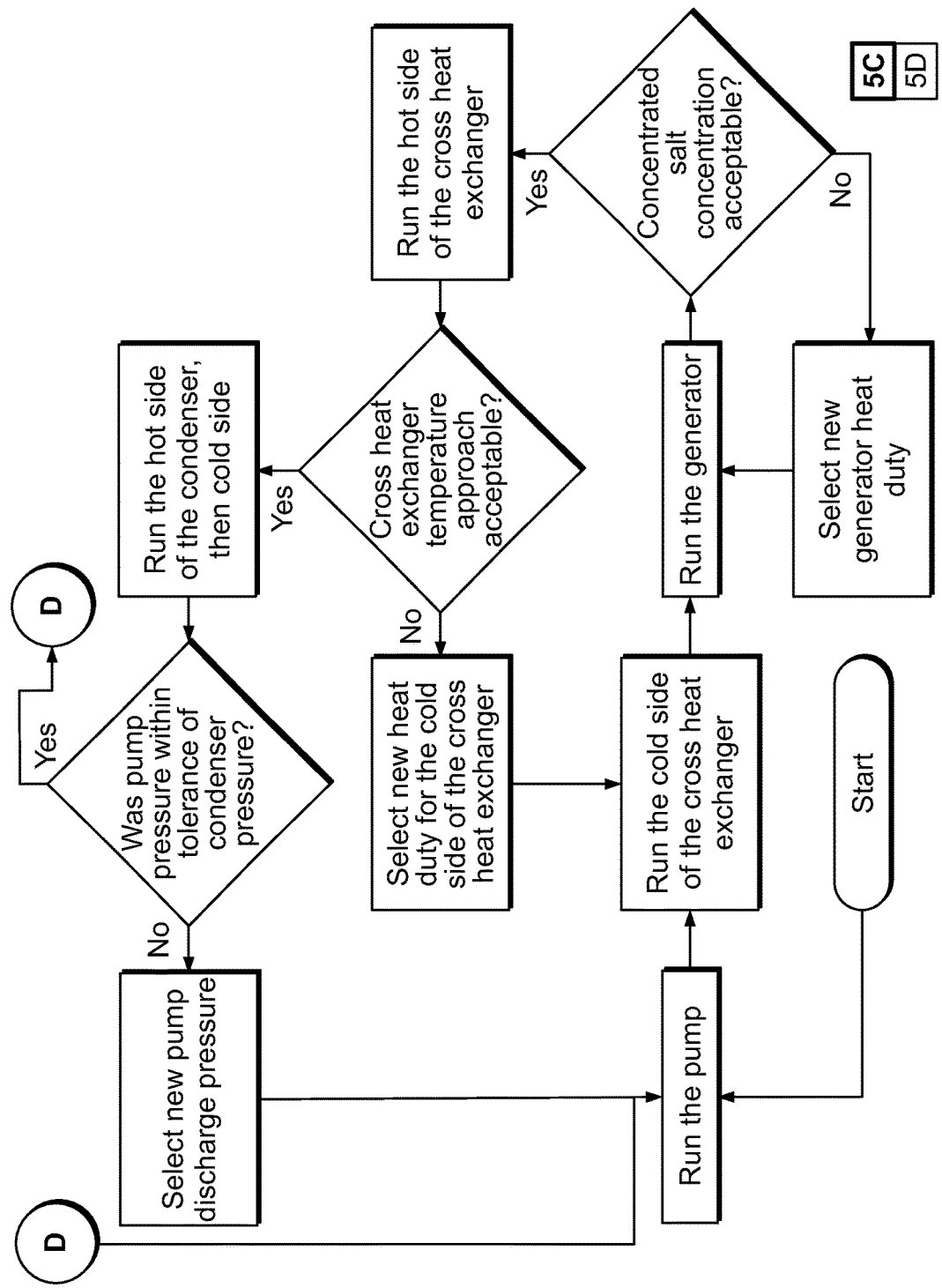
FIGS. 5C and 5D show a simulation method for an absorption-driven heat pump.
Figure 5D:
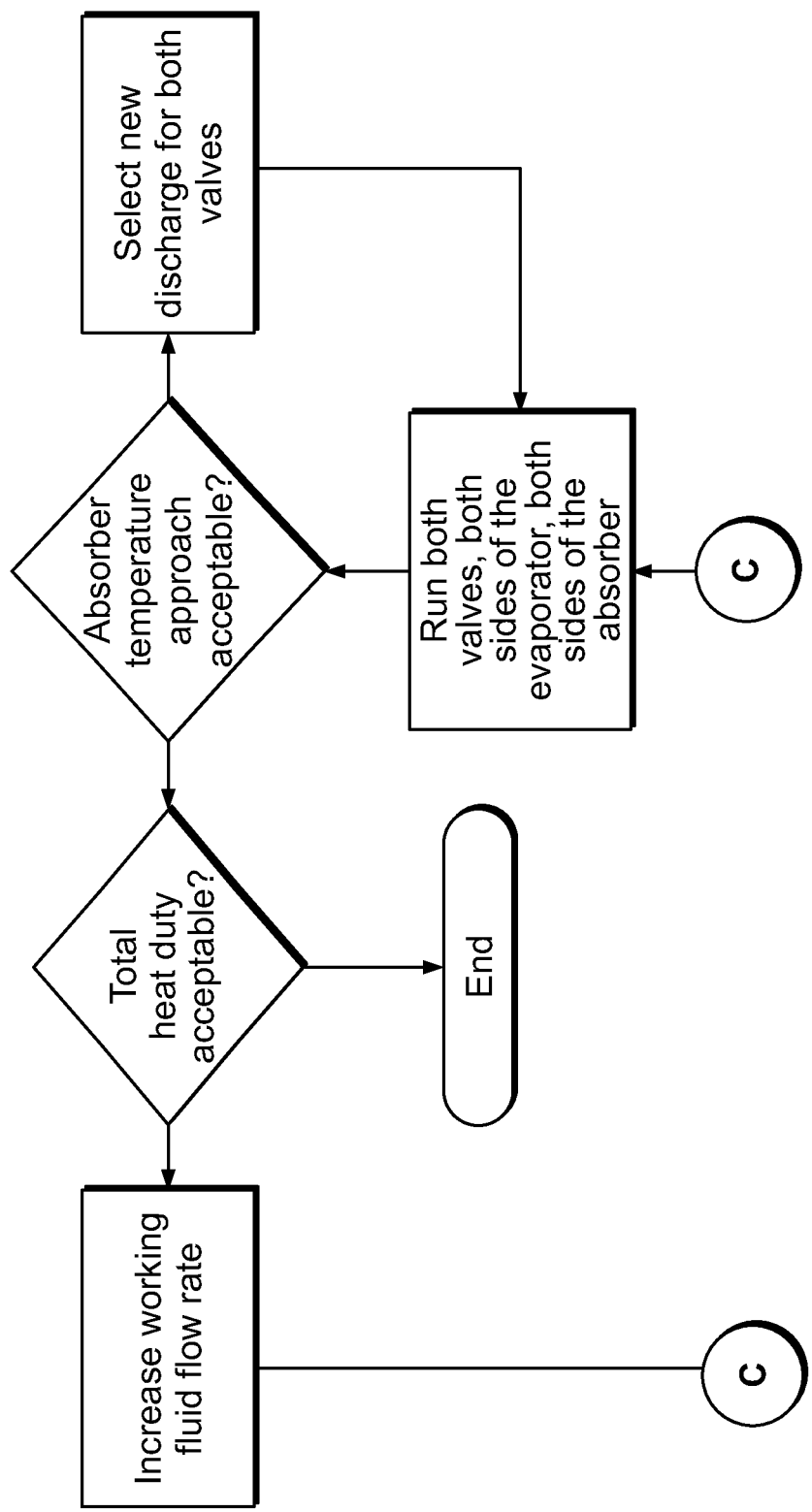

A conceptual diagram of a absorption-driven heat pump is shown in FIG. 5A, and a sample flow sheet is shown in FIG. 5B. A sample simulation flow sheet for the absorption-driven heat shown in FIG. 5B, with its convergence logic shown in FIG. 5C. The convergence logic in FIG. 5C does not show convergence loops.

Optimization Approach for a Heat Pump-Driven Reboiler

A preferred embodiment of this invention uses a heat pump to heat the reboiler. An embodiment of this invention simulates processes by coupling an acid gas capture system simulation, like that shown in FIG. 1, with a heat pump simulation. First the acid gas capture system's simulation is run, and then the stream to be heated is inserted into system. Likewise a source of waste heat, such as the indirect cooling stream, is supplied to the stream to be cooled. The simulation for the heat pump is then run, where the heat provided by the heat pump $D_{heat\ pump}$ is $$D_{heat\ pump} = D_{HP-absorber} + D_{HP-condenser},$$

where, $D_{heat\ pump}$ is the heat provided by the heat pump;
$D_{HP-absorber}$ is the heat provided by the heat pump's absorber;
$D_{HP-condenser}$ is the heat provided by the heat pump's condenser.

The extent of a heat pump augmenting a heater can be quantified as $$\xi_i \equiv \frac{D_{heat\ pump}}{D_{heater} + D_{heat\ pump}},$$

where
$\xi_i$ is the extent of the heat pump for heating location i;
$D_{heat\ pump}$ is the heat provided by the heat pump;
$D_{heater}$ is the heat provided by the heater.

In the case of a design which employs a heat pump for the entirety of the reboiler's heating, $\xi_{reboiler}=1$, so $$D_{heat\ pump} = D_{heater}.$$

Then this heat duty can be either entered into the heat pump simulation and obtained by changing the heat pump's working fluid flow rate, or the heat pump simulation can simply run once and its extensive variables such as heat duties and flow rates are multiplied by the factor $$\left(\frac{D_{heater}}{D_{heat\ pump}}\right)\xi_i.$$

A preferred embodiment of this invention may then perform an economic analysis to optimize all heat pump extents $\xi_i$, often just $\xi_{reboiler}$.

Methodology for Parallel Computation of Optimizations

Figure 6:
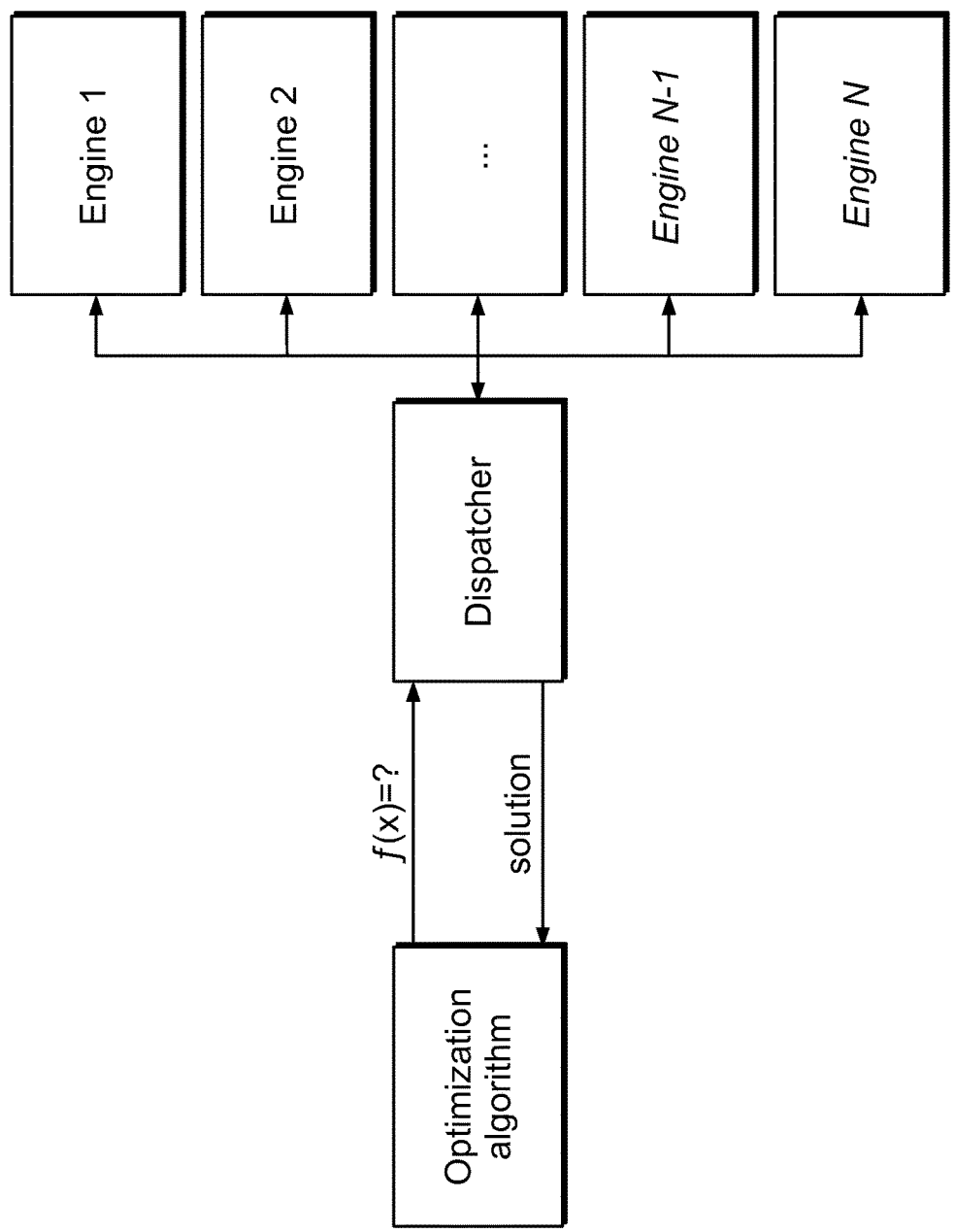
FIG. 6 shows a computational scheme for optimization. A dispatcher manages many requests for function evaluations, sending them to engines as they become available. Results from engines are returned to the dispatcher, which then returns the result to the optimization algorithm.
Figure 7:
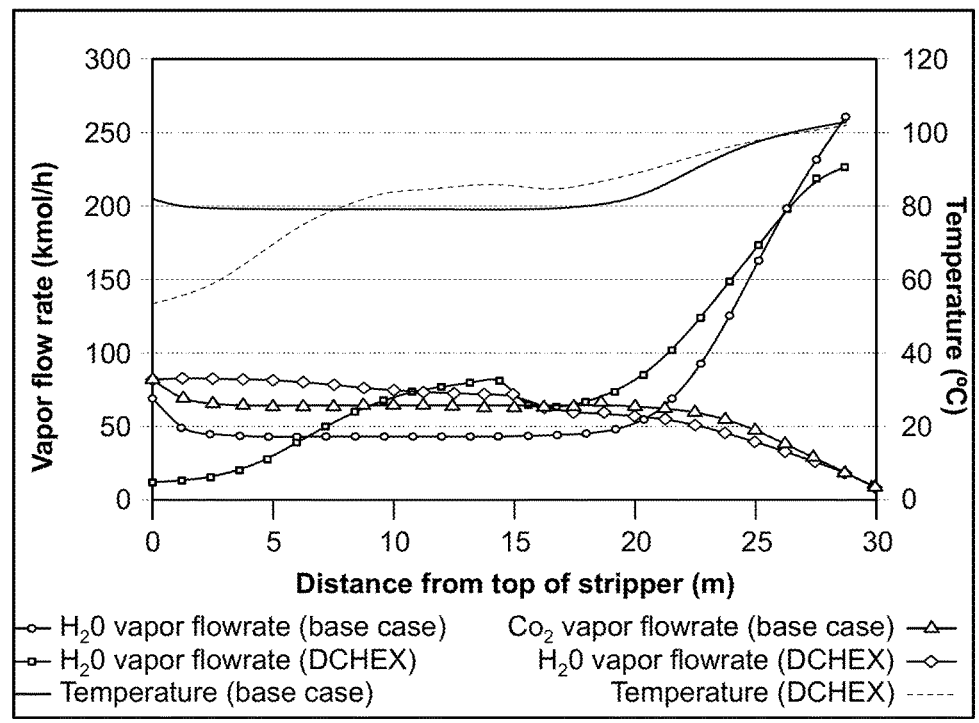
FIG. 7 shows the temperature and vapor profiles within the regeneration column.

An embodiment of this invention distributes the computational workload of optimization such that multiple threads or processes can simultaneously contribute to the problem solution. An example embodiment is shown in FIG. 6. Here an optimization routine can request simulation evaluations and then queues all requests and issues them to available simulators as they become available. Simulators may or may not be local to the system.

An Optimized Acid Gas Capture System

An embodiment of this invention is an optimized acid gas capture system best understood as the result of a series of improvements to a known method for acid gas capture following from the optimization methods discussed above. A conceptual flow sheet of a baseline acid gas capture system is shown in FIG. 1. A flue gas flows into the bottom of an absorption column, runs counter-current to a sorbent, then leaves the top of the column with less acid gas in it. This scrubbed flue gas is typically released to atmosphere.

The loaded sorbent then needs to be regenerated before being reused. It flows into the top of a regeneration column where it is heated, releases much of the captured acid gas, then flows back to the absorption column to begin the process again.

The acid gas released in the regeneration column typically exits from the top of the regeneration column. From there, it is usually compressed, and then pumped underground or otherwise used or disposed of.

A cross heat exchanger exchanges heat between the loaded and unloaded sorbent streams, reducing the process's required heating and cooling.

Another aspect of the invention concerns taking part of the loaded sorbent stream from the cross heat exchanger part way through, putting it into the top of the regeneration column as usual. The invention then allows the remainder of the loaded sorbent stream to continue through the distributed part of the central cross heat exchanger, then it is routed to a lower part of the regeneration column. A primary motivation for doing this is to avoid excessive vaporization at the top of the regeneration column. Vapor leaving the regenerator generally needs to be cooled, resulting in energy consumption as well as the loss of heat that the vapor had. By preferentially transferring heat to the center of the regeneration column, unnecessary energy loss is avoided.

The distributed cross heat exchanger may be further improved by rerouting vapor produced in the cross heat exchangers to the bottom of the regeneration column. However it should be noted that this rerouting may be unnecessary for implementations wherein the cross heat exchangers do not produce an appreciable amount of vapor.

One or more heat pumps may be applied to this process. Heat pumps tend to be either compression-driven or absorption-driven. Alternative driving forces include magnetic phenomena and thermoelectric phenomena. Typically a heat pump should apply heating to the reboiler, either assisting the ordinarily present means of heating or replacing it. Any heat pumps would require a driving force, such as work for a compression-driven heat pump or high-temperature heat for an absorption-driven heat pump. High-temperature heat may be provided by steam. Additionally a heat pump would require a source of low-temperature heat. It is generally preferable for the low-temperature heat to be provided by a source which is cooled, though environmental or waste heat, or some combination, may be used.

An example of another aspect of the invention is that an absorption-driven heat pump may be used to replace the regeneration column's reboiler. Notably the heat pump's evaporator is effected by heat exchangers within the acid gas capture system, allowing the heat pump to draw low-temperature heat from the acid gas capture system. Another example using an absorption-driven heat pump is that of using one or more coolant loops to draw low-temperature heat from the acid gas capture system and delivers it to the heat pump for indirect cooling.

Other novel aspects of the invention include drawing heat from the heat exchangers associated with the wash columns on the flue gas before and after the absorber, the condenser on the regeneration column, and on the heat exchanger on the unloaded sorbent.

The following examples employ the methodologies of this invention to model both basic acid gas capture system designs and designs embodying this invention. Simulations discussed in the examples have been conducted in Aspen Plus V8.0.

The acid gas capture systems capture carbon dioxide, $CO_2$, by using an aqueous mixture of monoethanolamine (MEA) and methyldiethanolamine (MDEA). The relevant chemical species are listed in Table 1.a.

TABLE 1.a

Chemical species present in example acid gas capture processes.

| Short name | Full name | Formula |
|---|---|---|
| $H_2O$ | water | $H_2O$ |
| MEA | monoethanolamine | $C_2H_7NO$ |
| $CO_2$ | carbon dioxide | $CO_2$ |
| $N_2$ | nitrogen | $N_2$ |
| $O_2$ | oxygen | $O_2$ |
| $OH^-$ | hydroxide | $OH^-$ |
| $MEAH^+$ | protonated monoethanolamine | $[MEA - H]^+$ |
| $H_3O^+$ | hydronium | $H_3O^+$ |
| $MEACOO^{--}$ | monoethanolamine-carbon dioxide complex | $C_3H_6NO_3^-$ |
| $HCO_3^-$ | bicarbonate | $HCO_3^-$ |
| $CO_3^{2-}$ | carbonate | $CO_3^{2-}$ |
| MDEA | methyldiethanolamine | MDEA |
| $MDEAH^+$ | protonated methyldiethanolamine | $[MDEA - H]^+$ |

TABLE 1.b

Chemical species present in example absorption-driven heat pumps.

| Short name | Full name | Formula |
|---|---|---|
| $H_2O$ | water | $H_2O$ |
| LiBr | lithium bromide | LiBr |
| $Li^+$ | lithium cation | $Li^+$ |
| $H_3O^+$ | hydronium | $H_3O^+$ |
| LiOH | lithium hydroxide | LiOH |
| HBr | hydrobromic acid | HBr |
| $Br^-$ | bromide | $Br^-$ |
| $OH^-$ | hydroxide | $OH^-$ |

Equilibrium reactions are listed in Table 2.a.

TABLE 2.a

Equilibrium reactions in example acid gas capture processes.

$$K_{eq_i} \equiv \frac{\prod_{products\,j}(\gamma_j C_j)^{\alpha_{i,j}}}{\prod_{reactants\,j}(\gamma_j C_j)^{\alpha_{i,j}}} = A_i + \frac{B_i}{T} + C_i \ln(T) + D_i T + E_i \frac{P - P_{ref}}{P_{ref}}$$

| i | Reaction i | $A_i$ | $B_i$ | $C_i$ | $D_i$ | $E_i$ |
|---|---|---|---|---|---|---|
| i | $2\,H_2O \rightleftharpoons H_3O^+ + OH^-$ | 132.89888 | −13445.9 | −22.4773 | 0 | 0 |
| ii | $2\,H_2O + CO_2 \rightleftharpoons H_3O^+ + HCO_3^-$ | 231.465439 | −12092.1 | −36.7816 | 0 | 0 |
| iii | $H_2O + HCO_3^- \rightleftharpoons H_3O^+ + CO_3^{2-}$ | 216.050446 | −12431.7 | −35.4819 | 0 | 0 |

TABLE 2.a-continued

Equilibrium reactions in example acid gas capture processes.

$$K_{eq_i} \equiv \frac{\prod_{products\,j}(\gamma_j C_j)^{\alpha_{i,j}}}{\prod_{reacants\,j}(\gamma_j C_j)^{\alpha_{i,j}}} =$$

$$A_i + \frac{B_i}{T} + C_i \ln(T) + D_i T + E_i \frac{P - P_{ref}}{P_{ref}}$$

| i | Reaction i | $A_i$ | $B_i$ | $C_i$ | $D_i$ | $E_i$ |
|---|---|---|---|---|---|---|
| iv | $H_2O + MEAH^+ \rightleftharpoons H_3O^+ + MEA$ | −3.038325 | −7008.357 | 0 | −0.00313489 | 0 |
| v | $H_2O + MEACOO^- \rightleftharpoons HCO_3^- + MEA$ | −0.52135 | −2545.53 | 0 | 0 | |
| vi | $MDEAH^+ + H_2O \rightleftharpoons H_3O^+ + MDEA$ | −9.4165 | −4234.98 | 0 | 0 | 0 |

TABLE 2.b

Equilibrium reactions in example absorption-driven heat pumps.

$$K_{eq_i} \equiv \frac{\prod_{products\,j}(\gamma_j C_j)^{\alpha_{i,j}}}{\prod_{reacants\,j}(\gamma_j C_j)^{\alpha_{i,j}}} =$$

$$A_i + \frac{B_i}{T} + C_i \ln(T) + D_i T + E_i \frac{P - P_{ref}}{P_{ref}}$$

| i | Reaction i | $A_i$ | $B_i$ | $C_i$ | $D_i$ | $E_i$ |
|---|---|---|---|---|---|---|
| vii | $LiBr \rightarrow Li^+ + Br^-$ | — | — | — | — | — |
| viii | $2\,H_2O \rightleftharpoons H_3O^+ + OH^-$ | 132.89888 | −13445.9 | −22.4773 | 0 | 0 |
| ix | $H_2O + HBr \rightleftharpoons H_3O^+ + Br^-$ | ? | ? | ? | ? | ? |
| x | $LiOH \rightleftharpoons OH^- + Li^+$ | −4.430563 | 0 | 0 | 0 | 0 |

TABLE 2.c

Kinetic reactions for rate-based reactive distillation columns in example acid gas capture processes.

$$\frac{dC_i}{dt} = hVk_i e^{\left(-\frac{E_i}{RT}\right)}$$

| i | Reaction i | $k_i$ | $E_i / \frac{j}{kmol}$ |
|---|---|---|---|
| xi | $OH^- + CO_2 \rightarrow HCO_3^-$ | $1.33 \cdot 10^{17}$ | $5.5468 \cdot 10^7$ |
| xii | $HCO_3^- \rightarrow OH^- + CO_2$ | $6.63 \cdot 10^{16}$ | $1.0741 \cdot 10^8$ |
| xiii | $MEA + CO_2 + H_2O \rightarrow MEACOO^- + H_3O^+$ | $3.02 \cdot 10^{14}$ | $4.1262 \cdot 10^7$ |
| xiv | $MEACOO^- + H_3O^+ \rightarrow MEA + CO_2 + H_2O$ | $5.52 \cdot 10^{23}$ | $6.9154 \cdot 10^7$ |
| xv | $MDEA + CO_2 + H_2O \rightarrow MDEAH^+ + HCO_3^-$ | $2.22 \cdot 10^7$ | $3.7777 \cdot 10^7$ |
| xvi | $MDEAH^+ + HCO_3^- \rightarrow MDEA + CO_2 + H_2O$ | $1.06 \cdot 10^{16}$ | $1.0637 \cdot 10^8$ | absorption of $CO_2$ into water produces hydronium, thus lowing the pH $$pH = -\log(\gamma_{H_3O^+}[H_3O^+])$$

showing why $CO_2$ is considered acid gas.

The absorption-driven heat pumps involved use aqueous lithium bromide as a working solution. The relevant chemical species are listed in Table 1.b. Equilibrium reactions are listed in Table 2.b.

The vapor phase is modeled by the Redlich-Kwong equation of state, $$P = \frac{RT}{V_m - b} - \frac{a}{V_m(V_m + b)\sqrt{T}}$$

where $$a = \left(\sum_i x\sqrt{a_i}\right)^2;$$

$$b = \sum_i x_i b_i;$$

$$a_i = 0.42748023 \frac{R^2 T_{c_i}^{2.5}}{P_{c_i}};$$

$$b_i = 0.08664035 \frac{R T_{c_i}}{P_{c_i}};$$

R is the ideal gas constant;

T is temperature;

P is pressure;

$T_{c_i}$ is the critical temperature of component i;

$P_{c_i}$ is the critical pressure of component i.

The liquid phase Gibbs energy is modeled by the unsymmetric electrolyte non-random two-liquid (ENRTL) model, $$\ln(G^{ex}) = \ln(G^{ex,local}) + \ln(G^{ex,PDH}),$$

where
$G^{ex}$ is the excess Gibbs energy;
$G^{ex,local}$ is the local contribution to the excess Gibbs energy, taken from earlier NRTL theory for non-electrolytes;
$G^{ex,PDH}$ is the long-range contribution to the excess Gibbs energy, taken from Pitzer-Debye-Huckel theory.
The local contribution to Gibbs energy is calculated as $$\frac{G^{ex,local}}{nRT} = \sum_i \frac{X_i \sum_j X_j G_{ji} \tau_{ji}}{\sum_j X_j G_{ji}},$$

where
$X_i = Z_i x_i$;
$x_i$ is the mole fraction of component i;

$$Z_i \equiv \begin{cases} |z_i| & \text{if } i \text{ is an ion} \\ 1 & \text{if else} \end{cases};$$

$z_i$ is the integer charge of a species;
$\tau_{i,j}$ is given in Table 3.b;
$G_{i,j}$ is given in Table 3.c.

TABLE 3.a-continued

Correlations for the ENRTL parameter $\alpha_{i,j}$.

| $\alpha_{row,column}$ | molecular | cation | anion | cation/anion |
|---|---|---|---|---|
| anion | $\sum_c Y_c \alpha_{ca,m}$ | $\sum_{a'} Y_{a'} \alpha_{ca,ca'}$ | 0 | 0 |
| cation/anion | 0.2 | 0 | 0 | 0.2 |

TABLE 3.b

Correlations for the ENRTL parameter $\tau_{i,j}$.

| $\tau_{row,column}$ | molecular | cation | anion | cation/anion |
|---|---|---|---|---|
| molecular | Table 3.e | $\frac{\ln G_{i,j}}{\alpha_{i,j}}$ | $\frac{\ln G_{i,j}}{\alpha_{i,j}}$ | 0 |
| cation | $\frac{\ln G_{i,j}}{\alpha_{i,j}}$ | 0 | $\frac{\ln G_{i,j}}{\alpha_{i,j}}$ | 0 |
| anion | $\frac{\ln G_{i,j}}{\alpha_{i,j}}$ | $\frac{\ln G_{i,j}}{\alpha_{i,j}}$ | 0 | 0 |
| cation/anion | 0 | 0 | 0 | 0 |

TABLE 3.c

Correlations for the ENRTL parameter $G_{i,j}$.

| $G_{row,column}$ | molecular | cation | anion | cation/anion |
|---|---|---|---|---|
| molecular | $e^{-\alpha_{mm'}\tau_{mm'}}$ | $\sum_a Y_a G_{,ca}$ | $\sum_c Y_c G_{m,ca}$ | $e^{-\alpha_{m,ca}\tau_{m,ca}}$ |
| cation | $\sum_a Y_a G_{ca,m}$ | 0 | $\sum_{c'} Y_{c'} G_{ca,c'a}$ | 0 |
| anion | $\sum_c Y_c G_{ca,m}$ | $\sum_{a'} Y_{a'} G_{ca,ca'}$ | 0 | 0 |
| cation/anion | $e^{-\alpha_{ca,m}\tau_{ca,m}}$ | 0 | 0 | $e^{-\alpha_{ca,ca}\tau_{ca,ca}}$ |

TABLE 3.a

Correlations for the ENRTL parameter $\alpha_{i,j}$.

| $\alpha_{row,column}$ | molecular | cation | anion | cation/anion |
|---|---|---|---|---|
| molecular | Table 3.d | $\sum_a Y_a \alpha_{ca,m}$ | $\sum_c Y_c \alpha_{ca,m}$ | 0.2 |
| cation | $\sum_a Y_a \alpha_{ca,m}$ | 0 | $\sum_{c'} Y_{c'} \alpha_{ca,c'a}$ | 0 |

TABLE 3.d.

Values for $\alpha_{ij}$ where both i and j are molecular (non-ionic) species.

| $\alpha_{ij}$ | $H_2O$ | MEA | $CO_2$ | $N_{22}$ | $O_2$ | MDEA |
|---|---|---|---|---|---|---|
| $H_2O$ | 0.3 | 0.2 | 0.2 | 0.3 | 0.3 | 0.3 |
| MEA | 0.2 | 0.3 | 0.3 | 0.3 | 0.3 | 0.3 |
| $CO_2$ | 0.2 | 0.3 | 0.3 | 0.3 | 0.3 | 0.3 |
| $N_2$ | 0.3 | 0.3 | 0.3 | 0.3 | 0.3 | 0.3 |
| $O_2$ | 0.3 | 0.3 | 0.3 | 0.3 | 0.3 | 0.3 |
| MDEA | 0.3 | 0.3 | 0.3 | 0.3 | 0.3 | 0.3 |

TABLE 3.e

Values for $\tau_{i,j}$ where both i and j are molecular (non-ionic) species.

| $\tau_{i,j}$ | H$_2$O | MEA | CO$_2$ | N$_2$ | O$_2$ | MDEA |
|---|---|---|---|---|---|---|
| H$_2$O | 0 | $1.438498 + \frac{99.02104}{T}$ | $10.064 - \frac{3268.135}{T}$ | 0 | 0 | 0 |
| MEA | $-1.046602 - \frac{337.5456}{T}$ | 0 | 0 | 0 | 0 | 0 |
| CO$_2$ | $10.064 - \frac{3268.135}{T}$ | 0 | 0 | 0 | 0 | 0 |
| N$_2$ | 0 | 0 | 0 | 0 | 0 | 0 |
| O$_2$ | 0 | 0 | 0 | 0 | 0 | 0 |
| MDEA | 0 | 0 | 0 | 0 | 0 | 0 |

The excess Gibbs free energy from Pitzer-Debye-Huckel theory is, $$\frac{G^{ex,PDH}}{nRT} = -\frac{4A_\varphi I_x}{\rho}\ln[1+\rho\sqrt{I_x}],$$

where $$A_\varphi = \frac{1}{3}\sqrt{\frac{2\pi N_A}{v_s}}\left(\frac{Q_e^2}{\varepsilon_s k_B T}\right)^{\frac{3}{2}};$$

N$_A$ is Avogadro's number, $$\frac{6.02214129(27)\cdot 10^{23}}{\text{mol}};$$

Q$_e$ is the elementary charge of an electron, 1.602176565 (35)·10$^{-19}$ C;

$$v_s = \frac{\sum\limits_{i\in sorbents} x_i v_{m_i}}{\sum\limits_{i\in sorbents} x_i};$$

$\kappa_B$ is the Boltzmann constant, $$k_B \equiv \frac{R}{N_A} = 1.3806488(13)\cdot 10^{23};$$

$$\varepsilon_s = \frac{\sum\limits_{i\in sorbents} x_i M_i \varepsilon_i}{\sum\limits_{i\in sorbents} x_i M_i};$$

M$_i$ is the molecular mass of component i;

$I_x = \frac{1}{2}\Sigma z_i^2 x_i$;

$\rho$ is the closest approach parameter, estimated as $3 \leftrightarrows 10^{-10}$ m;

$\varepsilon_i$ is the relative permittivity of component i, which has the value given in Table 4.

TABLE 4

Relative permittivity $\epsilon_i$ values.

$$\varepsilon_i = A_i + B_i\left(\frac{1}{T} - \frac{1}{C_i}\right)$$

| | A$_i$ | B$_i$ | C$_i$ |
|---|---|---|---|
| MEA | 37.72 | 0 | 298.15 |
| H$_2$O | 78.51 | 31989.4 | 298.15 |
| CO$_2$ | 1.449 | 0 | 296.15 |
| N$_2$ | 1.357416 | 8.8599 | 298.15 |
| O$_2$ | 1.412544 | 10.359 | 298.15 |

Activity coefficients are calculated from the Gibbs energy models using the Thermodynamics relationship $$\ln\gamma_i = \frac{1}{RT}\left(\frac{\partial G^{ex}}{\partial n_i}\right)_{T,P,n_{j\neq i}}$$

yielding $$\ln(\gamma_i) = \ln(\gamma_i^{lc}) + \ln(\gamma_i^{PDH}).$$

The local term of the activity coefficient $\gamma_i^{lc}$ is then given by $$\frac{1}{Z_i}\ln(\gamma_i^{lc}) = \frac{\sum\limits_j X_j G_{ji}\tau_{ji}}{\sum\limits_j X_j G_{ji}} + \sum\limits_j\left[\frac{X_j G_{ij}}{\sum\limits_k X_k G_{kj}}\left(\tau_{ij} - \frac{\sum\limits_k X_k G_{kj}\tau_{kj}}{\sum\limits_k X_k G_{kj}}\right)\right],$$

and the long-range term of the activity coefficient $\gamma_i^{PDH}$ is then given by $$\ln(\gamma_{i\in molecular}^{PDH}) = \frac{2A_\varphi I_x^{2/3}}{1+\rho\sqrt{I_x}}$$

for molecular species i and $$-\frac{\ln(\gamma_{i\in ionic}^{PDH})}{A_\varphi} = \frac{2z_i^2}{\rho}\ln(1+\rho\sqrt{I_x}) + \frac{z_i^2\sqrt{I_z} - 2I_x^{3/2}}{1+\rho\sqrt{I_x}}$$

for ionic species i.

Excess liquid entropies $H_m^{ex,liquid}$ can then be calculated as $$\frac{H^{ex,liquid}}{n} = -RT^2 \sum_i x_i \frac{\partial(\ln \gamma_i)}{\partial T},$$

and excess molar liquid entropies as $$\frac{S^{ex,liquid}}{n} = \frac{(H^{ex,liquid} - G^{ex,liquid})}{nT}.$$

Columns present in examples are all of a uniform type to facilitate comparisons. All are packed with Sulzer Mellapak 125Y structured packing. All towers employ rigorous rate-based models as opposed to equilibrium stages or to calculations based on HETP (height equivalent to a theoretical plate).

The absorption column contains a packed height of 30 m and a packed diameter of 1.85044 m. It is operated at 1.02 bar at the top of the column with a 0.04 bar pressure drop over the entire column. The regeneration column contained a packed height of 30 m and a packed diameter of 1.1 m. It is operated at 1.025 bar throughout the column.

All heat exchangers were modeled with an overall heat transfer coefficient of $$U = 850 \frac{w}{m^2 \cdot K}.$$

The primary variable associated with heat exchangers is their heat exchanging surface area. A heat exchanger is a surface area of zero is exactly equivalent to no heat exchanger at all, so any heat exchangers receiving no surface area after optimization are considered to be removed from the process.

The flue gas is composed of $H_2O$, $CO_2$, $N_2$, and $O_2$, with the portions given in Tables 6.a and 6.b.

TABLE 5.a

Heat capacities for species using the polynomial expression.

$$\frac{C_p^{*,IG}}{\frac{J}{kmol \cdot K}} = \begin{cases} C_{1_i} + C_{2_i}T + C_{3_i}T^2 + C_{4_i}T^3 + C_{5_i}T^4 + C_{6_i}T^5 \\ C_{9_i} + C_{10_i}T \\ [C_{2_i} + 2C_{3_i}T + 3C_{4_i}T^2 + 4C_{5_i}T^3 + 5C_{6_i}T^4] \,|_{C_{8_i}}^T + \\ C_{1_i} + C_{2_i}C_{8_i} + C_{3_i}C_{8_i}^2 + C_{4_i}C_{8_i}^3 + C \end{cases}$$

|  | $H_2O$ | $CO_2$ |
| --- | --- | --- |
| $C_{1_i}$ | 33738.112 | 19795.19 |
| $C_{2_i}$ | −7.0175634 | 73.436472 |
| $C_{3_i}$ | 0.027296105 | −0.056019384 |
| $C_{4_i}$ | −1.6646536 · 10⁻⁵ | 1.715332 · 10⁻⁵ |
| $C_{5_i}$ | 4.2976136 · 10⁻⁹ | 0 |
| $C_{6_i}$ | −4.169608 · 10⁻¹³ | 0 |
| $C_{7_i}/K$ | 200 | 300 |
| $C_{8_i}/K$ | 3000 | 1088.6 |
| $C_{9_i}$ | 33256 | 29099 |
| $C_{10_i}$ | 1.8978 · 10⁻²⁰ | 0.71876 |
| $C_{11_i}$ | 9.2846 | 1.6368 |

TABLE 5.a-continued

Heat capacities for species using the polynomial expression.

$$\frac{C_p^{*,IG}}{\frac{J}{kmol \cdot K}} = \begin{cases} C_{1_i} + C_{2_i}T + C_{3_i}T^2 + C_{4_i}T^3 + C_{5_i}T^4 + C_{6_i}T^5 \\ C_{9_i} + C_{10_i}T \\ [C_{2_i} + 2C_{3_i}T + 3C_{4_i}T^2 + 4C_{5_i}T^3 + 5C_{6_i}T^4] \,|_{C_{8_i}}^T + \\ C_{1_i} + C_{2_i}C_{8_i} + C_{3_i}C_{8_i}^2 + C_{4_i}C_{8_i}^3 + C \end{cases}$$

|  | $H_2O$ | $CO_2$ |
| --- | --- | --- |

TABLE 5.b

Heat capacities for species using the trigonometric expression.

$$\frac{C_p^{*,IG}}{\frac{J}{kmol \cdot K}} = A_i + B_i \left(\frac{C_i}{T \sinh\left(\frac{C_i}{T}\right)}\right)^2 + D_i \left(\frac{E_i}{T \cosh\left(\frac{E_i}{T}\right)}\right)^2 \text{ if } C_{6_i} \leq T \leq C_{7_i};$$

|  | MEA | $N_2$ | $O_2$ |
| --- | --- | --- | --- |
| $C_{1_i}$ | 72140 | 29105 | 29103 |
| $C_{2_i}$ | 181500 | 8614.9 | 10040 |
| $C_{3_i}$ | 2030 | 1701.6 | 2526.5 |
| $C_{4_i}$ | 131400 | 103.47 | 9356 |
| $C_{5_i}$ | 860 | 909.79 | 1153.8 |
| $C_{6_i}/K$ | 298.15 | 50 | 50 |
| $C_{7_i}/K$ | 1500 | 1500 | 1500 |

TABLE 6.a

Dry flue gas composition.

| | Composition | |
| --- | --- | --- |
|  | mole % | mass % |
| $CO_2$ | 10.5 | 15.4 |
| $N_2$ | 83.0 | 77.7 |
| $O_2$ | 6.5 | 6.9 |

TABLE 6.b

Wet flue gas composition.

| | Composition | |
| --- | --- | --- |
|  | mole % | mass % |
| $H_2O$ | 6.8 | 4.2 |
| $CO_2$ | 9.8 | 14.8 |
| $N_2$ | 77.4 | 74.4 |
| $O_2$ | 6.0 | 6.6 |

These tables show that the dry flue gas is 10.5 mol % $CO_2$ and saturated with water. The unloaded sorbent is primarily composed of $H_2O$, MEA, MDEA, and $CO_2$. There are also slight traces of $O_2$ and $N_2$ due to the very slight amount of these inert gases which are absorbed in the absorption column but not fully removed in the regeneration tower.

The unloaded sorbent is considered to be 70 mol % $H_2O$, 27 mol % MEA, and 3 mol % MDEA. Then 0.14 moles of $CO_2$ are added for each mole of MEA. Due to the presence of a make-up stream to close the sorbent material balances, and the controlled capture rate to close the $CO_2$ material balance, the unloaded sorbent composition is always the same, only varying by the flow rate. Technically the $O_2$ and $N_2$ compositions can change slightly, but since they are severely dampened by their natural tenancy to leave the system through the vapor outlets, these compositions are always negligible.

Example 1

A basic acid gas capture system is shown in FIG. 1. This basic system uses the models, correlations, parameters, and default unit attributes discussed in the Examples Overview section. The central cross heat exchanger has 320 m² of heat exchanging surface area. The resulting regeneration energy is $$3.30 \frac{GJ}{\text{tonne}\,CO_2}.$$

The resulting stream tables can be seen in Stream Table 1.

Even small additions in heat exchanger surface area rapidly improve this figure, reaching $$3.06 \frac{GJ}{\text{tonne}\,CO_2 \text{ captured}} \text{ by } 1500 \frac{m^2}{\text{tonne}\,CO_2 \text{ captured}}.$$

Example 3

Another embodiment of the invention concerns a distributed cross heat exchanger configuration. This configuration adds two new degrees of freedom: 1) the portion of the loaded sorbent which exits partway through the cross heat exchanger and 2) how far through the heat exchanger partway is.

A preferred embodiment of this invention determines these parameters through optimization. As a generalization of the base configuration, the distributed cross heat exchanger reduces the base case for when both of its degrees of freedom are set to zero. The base case of this example has a regeneration energy of

STREAM TABLE 1

Stream table for the base case example with 320 m² of heat exchanger surface area from Example 1.

| | | Flue gas | Unloaded solvent, before CHEX | Unloaded solvent, after CHEX | Absorption tower vapor to wash tower | Wash tower bottoms to absorption tower | Treated flue gas | Loaded solvent, before CHEX | Loaded solvent, after CHEX | Stripper vapor to condenser | Captured acid gas |
|---|---|---|---|---|---|---|---|---|---|---|---|
| Component molar flow rates ($\frac{kmol}{hr}$) | $H_2O$ | 7.17E+01 | 1.92E+03 | 1.91E+03 | 3.11E+02 | 2.39+02 | 7.10E+01 | 1.86E+03 | 1.86E+03 | 6.99E+01 | 6.51E+00 |
| | MEA | 0.00E+00 | 9.09E+00 | 1.49E+01 | 2.47E-01 | 1.67E-02 | 2.98E-05 | 1.59E+02 | 1.59E+02 | 4.15E-02 | 4.17E-08 |
| | $CO_2$ | 1.04E+02 | 2.61E-02 | 1.21E+00 | 2.10E+01 | 2.11E-03 | 2.07E+01 | 5.56E-04 | 2.45E-05 | 8.31E+01 | 8.30E+01 |
| | $N_2$ | 8.21E+02 | 8.52E-02 | 8.52E-02 | 8.20E+02 | 2.14E-03 | 8.20E+02 | 1.02E-09 | 1.02E-09 | 8.52E-02 | 8.52E-02 |
| | $O_2$ | 6.37E+01 | 1.25E-02 | 1.25E-02 | 6.37E+01 | 3.14E-04 | 6.37E+01 | 3.86E-10 | 3.86E-10 | 1.25E-02 | 1.25E-02 |
| | MEAH$^+$ | 0.00E+00 | 1.13E+02 | 1.10E+02 | 0.00E+00 | 2.10E-01 | 0.00E+00 | 3.03E+01 | 3.10E+01 | 0.00E+00 | 0.00E+00 |
| | $H_3O^+$ | 0.00E+00 | 2.35E-07 | 1.88E-06 | 0.00E+00 | 3.81E-08 | 0.00E+00 | 5.96E-08 | 5.13E-09 | 0.00E+00 | 0.00E+00 |
| | MEACOO$^-$ | 0.00E+00 | 9.75E+01 | 9.44E+01 | 0.00E+00 | 1.98E-02 | 0.00E+00 | 3.02E+01 | 3.01E+01 | 0.00E+00 | 0.00E+00 |
| | $HCO_3^-$ | 0.00E+00 | 1.41E+01 | 1.76E+01 | 0.00E+00 | 1.85E-01 | 0.00E+00 | 4.01E-01 | 1.91E-01 | 0.00E+00 | 0.00E+00 |
| | $OH^-$ | 0.00E+00 | 9.44E-04 | 1.99E-03 | 0.00E+00 | 2.17E-05 | 0.00E+00 | 3.90E-02 | 2.86E-02 | 0.00E+00 | 0.00E+00 |
| | $CO_3^{-2}$ | 0.00E+00 | 2.11E+00 | 5.28E-01 | 0.00E+00 | 2.92E-03 | 0.00E+00 | 1.18E-01 | 3.85E-01 | 0.00E+00 | 0.00E+00 |
| | MDEA | 0.00E+00 | 9.71E+00 | 9.75E+00 | 1.23E-03 | 5.14E-04 | 8.35E-08 | 1.23E+01 | 1.24E+01 | 1.96E-04 | 1.62E-10 |
| | MDEAH$^+$ | 0.00E+00 | 2.80E+00 | 2.76E+00 | 0.00E+00 | 7.11E-04 | 0.00E+00 | 2.40E-01 | 1.42E-01 | 0.00E+00 | 0.00E+00 |

Example 2

Twenty-four simulations like that in Example 1 are done with central cross heat exchanger surface areas ranging from 0 m² (no cross heat exchanger) to $$1500 \frac{m^2}{\text{tonne}\,CO_2 \text{ captured}}.$$

In the case of no surface area, we find that the process consumes $$5.21 \frac{GJ \text{ heating}}{\text{tonne}\,CO_2 \text{ captured}}.$$

$$3.57 \frac{GJ}{\text{tonne}\,CO_2}.$$

After a rough optimization, the regeneration energy drops to $$3.31 \frac{GJ}{\text{tonne}\,CO_2}$$

without any new equipment or increase in equipment size.

Figure 8:
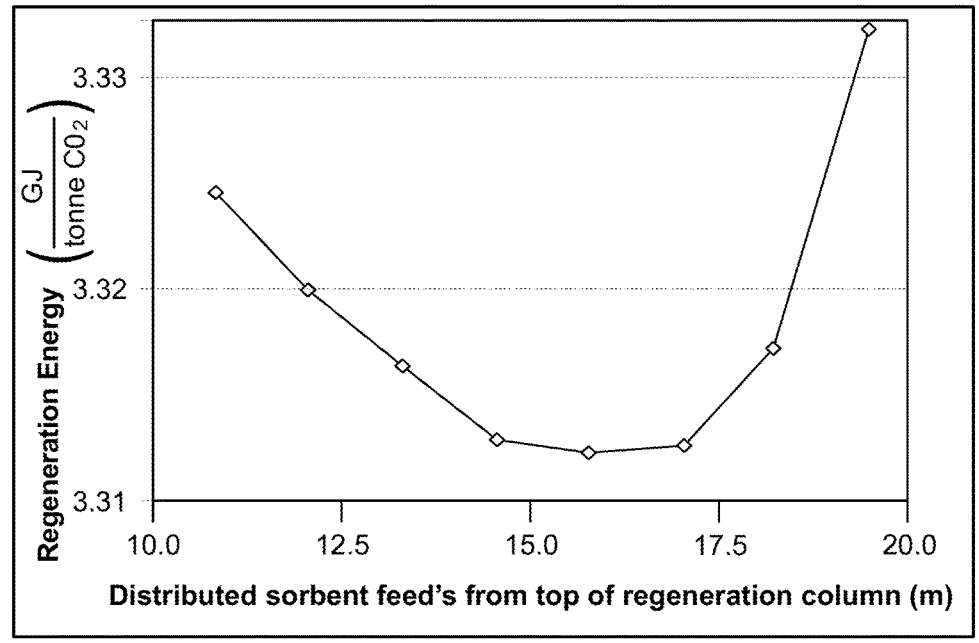
FIG. 8 shows a scatter plot of regeneration energies for a distributed cross heat exchanger configuration.

The temperature and vapor profiles within the regeneration column are compared in FIG. 8. The distributed heat exchanger configuration significantly reduces water vapor lost to the regeneration tower's condenser. An optimal placement can save about 1% on energy consumption compared to nearby alternatives.

Example 4

Figure 9:
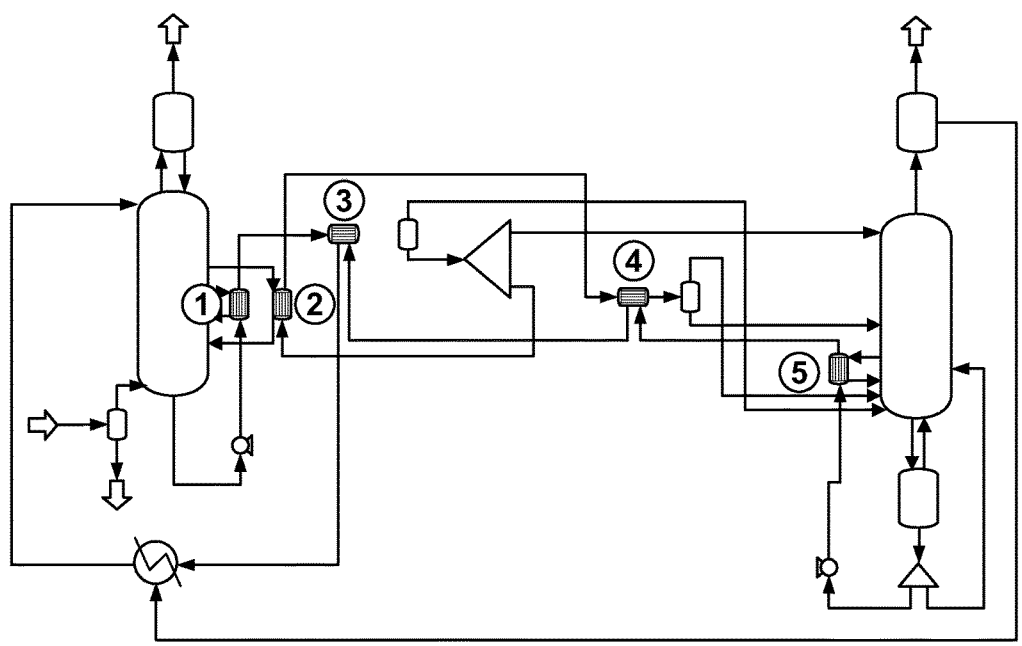
FIG. 9 shows a flow sheet for an acid gas capture system using a distributed cross heat exchanger configuration with vapor rerouted to the bottom of the regeneration column. Five heat exchangers are numbered and are referred to in Example 4.

Another embodiment of the invention begins from the system described in Example 1. It is then generalized to its full form and optimized as the plain distributed cross heat exchanger configuration was in Example 3. After optimization, the 320 m² of heat exchanger surface area was distributed amongst the five numbered heat exchangers in FIG. 9. The optimized portions were found to be: 1. 10.0%, 2. 0.0%, 3. 32.8%, 4. 26.5% and 5. 30.7%.

Additionally the material stream split fraction has been optimized, finding that 0.591 of the material stream should be sent to the intermediate point on the regeneration tower. The optimized stream tables results are shown in Stream Table 2.

STREAM TABLE 2

Stream table for the optimized example with 320 m2 of heat exchanger surface area from Example 4.

| | | | Unloaded solvent | | | Absorption tower | Wash tower bottom to | |
|---|---|---|---|---|---|---|---|---|
| | | Flue gas | before DCHEX | within DCHEX | after DCHEX | vapor to wash tower | absorption tower | Treated flue gas |
| Component Molar flow rate $\left(\frac{kmol}{hr}\right)$ | $H_2O$ | 7.17E+01 | 1.91E+03 | 1.91E+03 | 1.91E+03 | 2.76E-02 | 2.05E+02 | 7.10E+01 |
| | MEA | 0.00E+00 | 1.59E+02 | 1.50E+02 | 1.59E+02 | 2.13E-01 | 1.45E-02 | 3.01E-05 |
| | $CO_2$ | 1.04E+02 | 5.77E-04 | 1.64E-04 | 4.54E-05 | 2.09E+01 | 1.81E-03 | 2.07E+01 |
| | $N_2$ | 8.23E+02 | 4.39E-10 | 4.39E-10 | 4.39E-10 | 8.20E+02 | 1.83E-03 | 8.20E+02 |
| | $O_2$ | 5.37E+01 | 1.18E-10 | 1.18E-10 | 1.18E-10 | 6.37E+01 | 2.69E-04 | 6.37E+01 |
| | $MEAH^+$ | 0.00E+00 | 3.07E+01 | 3.06E+01 | 3.10E+01 | 0.00E+00 | 1.81E-01 | 0.00E+00 |
| | $H_3O^+$ | 0.00E+00 | 6.14E+08 | 2.45E+08 | 9.39E-08 | 0.00E+00 | 3.25E-08 | 0.00E+00 |
| | $MEACOG^-$ | 0.00E+00 | 3.03E+01 | 3.03E+01 | 3.03E+01 | 0.00E+00 | 1.72E-02 | 0.00E+00 |
| | $HCO_2^-$ | 0.00E+00 | 4.18E-01 | 3.12E-01 | 2.34E-01 | 0.00E+00 | 1.59E-01 | 0.00E+00 |
| | $OH^-$ | 0.00E+00 | 3.94E-02 | 3.70E-02 | 3.24E-02 | 0.00E+00 | 1.87E-05 | 0.00E+00 |
| | $CO_3^{-2}$ | 0.00E+00 | 1.21E-01 | 2.01E-01 | 3.14E-01 | 0.00E+00 | 2.53E-03 | 0.00E+00 |
| | MDEA | 0.00E+00 | 1.23E+01 | 1.23E+01 | 1.24E+01 | 1.04E-03 | 4.35E-04 | 8.75E-08 |
| | $MDEAH^+$ | 0.00E+00 | 2.43E-01 | 2.00E-01 | 1.63E-01 | 0.00E+00 | 8.00E-04 | 0.00E+00 |
| Total Flow $\left(\frac{kmol}{hr}\right)$ | | 1058.7 | 2139.7 | 2139.7 | 2139.7 | 1181.7 | 205.6 | 975.9 |
| Total Flow $\left(\frac{kmol}{hr}\right)$ | | 30.9 | 50.6 | 50.6 | 50.6 | 30.9 | 3.7 | 27.2 |
| Total Flow $\left(\frac{m^3}{hr}\right)$ | | 25055.4 | 51.7 | 50.8 | 50.1 | 32598.3 | 3.7 | 24891.8 |
| Temperature (° C.) | | 40.0 | 103.3 | 82.0 | 62.1 | 65.6 | 40.0 | 40.0 |
| Pressure (bar) | | 1.100 | 1.300 | 1.300 | 1.300 | 1.020 | 1.020 | 1.020 |
| Vapor Fraction | | 1.000 | 0.000 | 0.000 | 0.000 | 1.000 | 0.000 | 1.000 |

| | | Loaded solvent | | | Stripper | |
|---|---|---|---|---|---|---|
| | | before DCHEX | within DCHEX | after DCHEX | vapor to condenser | Captured acid gas |
| Component Molar flow rate $\left(\frac{kmol}{hr}\right)$ | $H_2O$ | 1.82E-03 | 1.92E+03 | 1.08E+03 | 2.78E+01 | 6.52E+00 |
| | MEA | 9.23E-00 | 1.20E+01 | 7.76E+00 | 5.73E-03 | 8.13E-09 |
| | $CO_2$ | 2.55E-02 | 1.02E-01 | 1.53E-01 | 8.30E+01 | 8.30E+01 |
| | $N_2$ | 8.51E-02 | 8.51E-02 | 3.74E-02 | 8.51E-02 | 8.51E-02 |
| | $O_2$ | 1.25E-02 | 1.25E-02 | 6.06E-03 | 1.25E-02 | 1.25E-02 |
| | $MEAH^+$ | 1.13E+02 | 1.17E+02 | 6.30E+01 | 0.00E+00 | 0.00E+00 |
| | $H_3O^+$ | 2.32E-07 | 8.41E-07 | 8.96E-07 | 0.00E+00 | 0.00E+00 |
| | $MEACOG^-$ | 9.77E+01 | 9.62E+01 | 5.38E+01 | 0.00E+00 | 0.00E+00 |
| | $HCO_2^-$ | 1.40E+01 | 1.65E+01 | 1.01E+01 | 0.00E+00 | 0.00E-00 |
| | $OH^-$ | 9.58E-04 | 1.53E-03 | 1.02E-03 | 0.00E+00 | 0.00E+00 |
| | $CO_3^{-2}$ | 2.12E+00 | 9.81E-01 | 3.53E-01 | 0.00E+00 | 0.00E+00 |

STREAM TABLE 2-continued

Stream table for the optimized example with 320 m2 of heat exchanger surface area from Example 4.

|  |  |  |  |  |  |  |
|---|---|---|---|---|---|---|
| MDEA | | 9.75E−00 | 9.68E+00 | 5.48E+00 | 4.71E−05 | 5.52E−11 |
| MDEAH+ | | 2.78E+00 | 2.85E+00 | 1.81E+00 | 0.00E+00 | 0.00E+00 |
| Total Flow $\left(\frac{kmol}{hr}\right)$ | | 2167.6 | 2167.7 | 1227.3 | 310.9 | 89.5 |
| Total Flow $\left(\frac{kmol}{hr}\right)$ | | 54.8 | 54.8 | 31.0 | 4.2 | 3.8 |
| Total Flow $\left(\frac{m^3}{hr}\right)$ | | 50.0 | 53.5 | 35.6 | 3047.8 | 2765.4 |
| Temperature (° C.) | | 40.9 | 70.8 | 87.6 | 67.3 | 40.0 |
| Pressure (bar) | | 1.300 | 1.300 | 1.300 | 1.025 | 1.025 |
| Vapor Fraction | | 0.000 | 0.000 | 0.000 | 1.000 | 1.000 |

Figure 10:
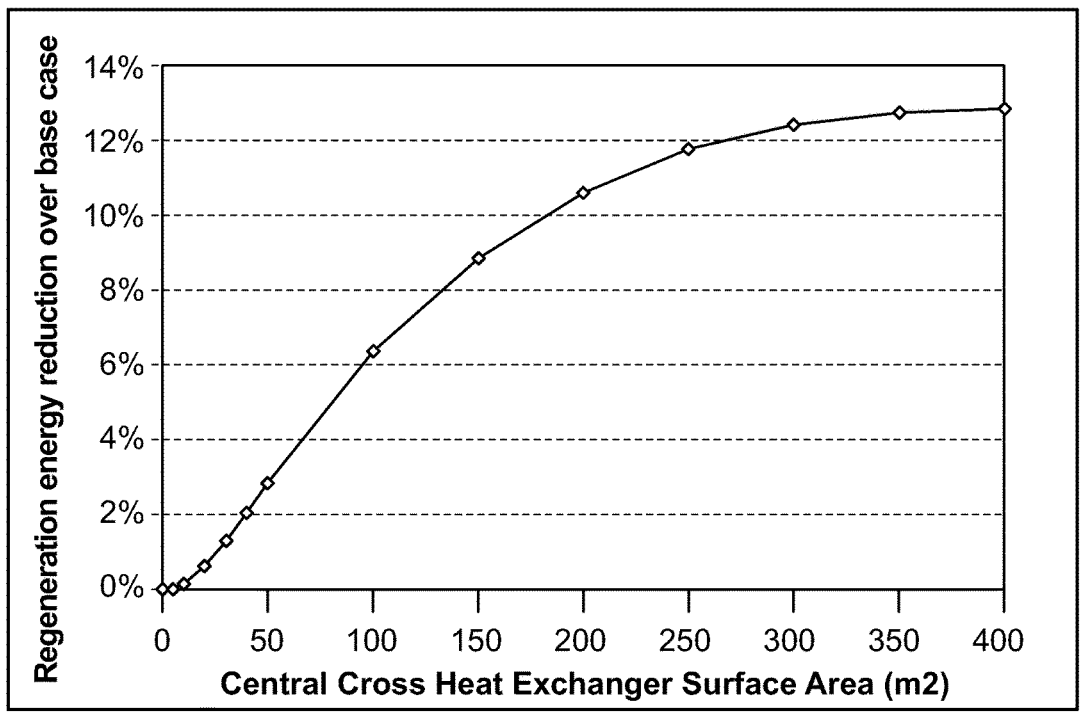
FIG. 10 is a scatter plot showing the reduction in regeneration energy between the base case configuration and a distributed cross heat exchanger configuration.

The optimized parameters are retained, and the total surface area of the process is varied from 0 to 1500 m², as in Example 2. The resulting regeneration energies are shown in FIG. 10. The energy savings range climb to 13% by 400 m² of total heat exchanger surface area. These energy savings can be seen in FIG. 11.

Example 5

Figure 11:
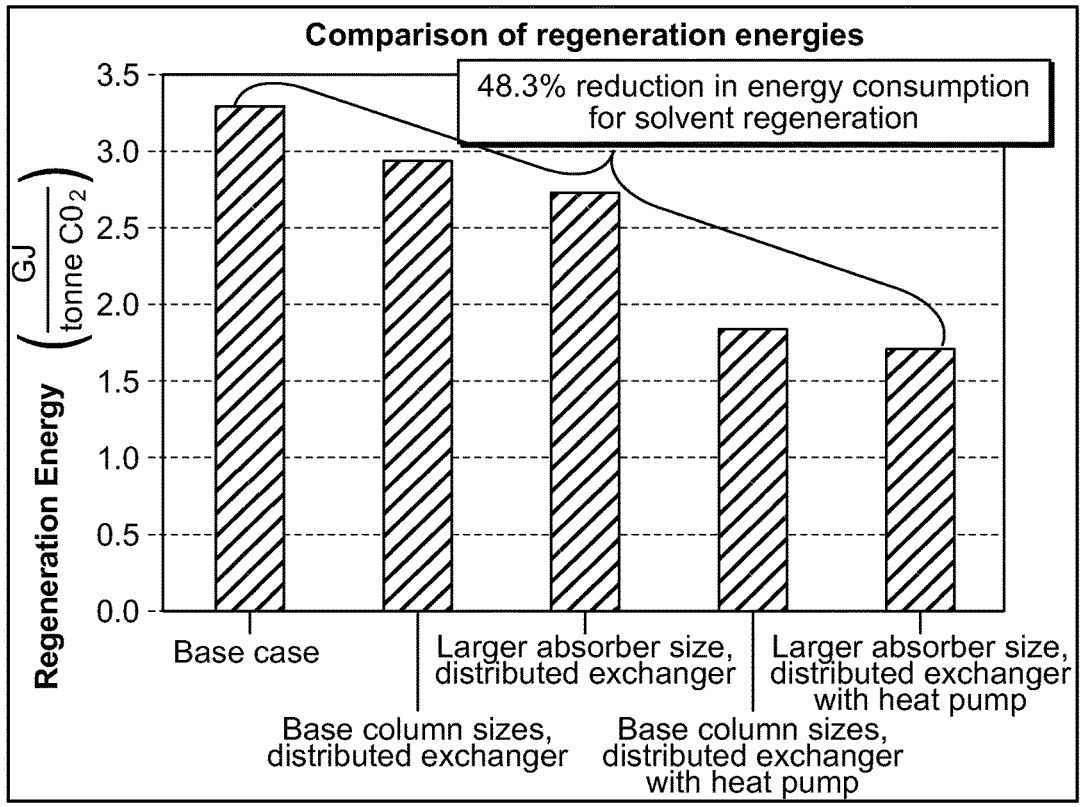
FIG. 11 is a bar graph of regeneration energies for various configurations.

Another embodiment of the invention begins with the system described in Example 4. The usual means of providing heat to the reboiler is replaced, and heating is instead done with an absorption-driven heat pump with aqueous lithium bromide as a working solution. The total cross heat exchanger area is selected to be 500 m². This was found to result in a 48.3% reduction in energy consumption for sorbent regeneration energy to $$1.67 \frac{GJ}{\text{tonne CO}_2}$$

as shown in FIG. 11.

The heat pump is found to have a coefficient of performance $$COP \equiv \frac{\text{useful heat gained}}{\text{useful heat consumed}} = 1.60,$$

effectively reducing the regeneration energy by another $$1 - 1/1.6 \approx 37.3\%$$

beyond the energy savings already achieved by the optimized distributed heat exchanger configuration.

The stream table for the heat pump is shown in Stream Table 3.

STREAM TABLE 3

Stream table for the aqueous lithium bromide absorption-driven heat pump in Example 5.

| | | Absorber | | Cross heat exchanger | | | | Condenser | | Evaporator | |
|---|---|---|---|---|---|---|---|---|---|---|---|
| | | to | from | to cold | from cold | to hot | from hot | to | from | to | from |
| Component mole flow rate $\left(\frac{kmol}{hr}\right)$ | H₂O | 5.01E+02 | 5.00E+02 | 5.00E+02 | 4.99E+02 | 4.01E+02 | 4.02E+02 | 9.80E+01 | 9.80E+01 | 9.80E+01 | 9.80E+01 |
| | LiBr | 0.00E+00 | 0.00E+00 | 0.00E+00 | 0.00E+00 | 0.00E+00 | 0.00E+00 | 0.00E+00 | 0.00E+00 | 0.00E+00 | 0.00E+00 |
| | Li⁺ | 1.39E+02 | 1.38E+02 | 1.38E+02 | 1.37E+02 | 1.37E+02 | 1.38E+02 | 0.00E+00 | 0.00E+00 | 0.00E+00 | 0.00E+00 |
| | H₃O⁺ | 9.19E−07 | 3.21E−06 | 3.21E−06 | 3.78E−06 | 1.52E−06 | 1.35E−06 | 0.00E+00 | 9.14E−05 | 9.14E−05 | 0.00E+00 |
| | LiOH | 1.49E+00 | 1.99E+00 | 1.99E+00 | 3.42E+00 | 3.79E+00 | 2.48E+00 | 0.00E+00 | 0.00E+00 | 0.00E+00 | 0.00E+00 |
| | HBr | 1.49E+00 | 1.99E+00 | 1.99E+00 | 3.42E+00 | 3.79E+00 | 2.48E+00 | 9.13E+05 | 1.13E−14 | 6.25E−15 | 9.13E−05 |
| | Br⁻ | 1.39E+02 | 1.38E+02 | 1.38E+02 | 1.37E+02 | 1.37E+02 | 1.38E+02 | 0.00E+00 | 9.13E−05 | 9.13E−05 | 0.00E+00 |
| | OH⁻ | 1.04E−09 | 8.22E−10 | 8.26E−10 | 4.18E−09 | 1.56E−08 | 3.27E−09 | 0.00E+00 | 2.69E−08 | 2.89E−09 | 0.00E+00 |
| Mole Flow $\left(\frac{kmol}{hr}\right)$ | | 781.7 | 781.2 | 781.2 | 779.7 | 681.4 | 682.7 | 98.0 | 98.0 | 98.0 | 98.0 |
| Mass Flow $\left(\frac{tonne}{hr}\right)$ | | 21243.5 | 21243.5 | 21243.5 | 21243.5 | 19478.8 | 19478.8 | 1764.6 | 1764.6 | 1764.6 | 1764.6 |
| Volume Flow $\left(\frac{m^3}{hr}\right)$ | | 18407.9 | 14.5 | 14.5 | 15.3 | 14.1 | 13.2 | 2606.05 | 1.9 | 1122.6 | 13102.9 |

STREAM TABLE 3-continued

Stream table for the aqueous lithium bromide absorption-driven heat pump in Example 5.

|  | Absorber | | Cross heat exchanger | | | | Condenser | | Evaporator | |
| --- | --- | --- | --- | --- | --- | --- | --- | --- | --- | --- |
|  | to | from | to cold | from cold | to hot | from hot | to | from | to | from |
| Temperature (° C.) | 119.5 | 103.3 | 103.4 | 135.7 | 176.5 | 140.7 | 176.5 | 109.3 | 61.0 | 63.3 |
| Pressure (bar) | 0.209 | 0.209 | 1.397 | 1.397 | 1.397 | 1.397 | 1.397 | 1.397 | 0.209 | 0.209 |
| Vapor Fraction | 0.151 | 0.000 | 0.000 | 0.000 | 0.000 | 0.000 | 1.000 | 0.000 | 0.086 | 1.000 |

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A system for separating one or more acidic gases from a gaseous mixture containing the same comprising:
    an absorber adapted to receive an acidic gas mixture, said absorber adapted to contact said acidic gas mixture with a lean solution of sorbent to remove the one or more acidic gases from the mixture to create an acidic gas rich solution of sorbent;
    a regenerator, having a top portion and a bottom portion, in communication with said absorber, said regenerator adapted to desorb the one or more acidic gases from the acidic gas rich solution of sorbent for capture and to regenerate a lean solution of sorbent that is directed to said absorber;
    first and second cross heat exchangers;
    said first cross heat exchanger in communication with said absorber to receive acidic gas rich solution of sorbent;
    a splitter adapted to receive acidic gas rich solution of sorbent received from said first cross heat exchanger and to direct a first portion of said acidic gas rich solution of sorbent to said second cross heat exchanger and a second portion of said acidic gas rich solution of sorbent to said regenerator;
    a flash drum, said flash drum adapted to receive said acidic gas rich solution of sorbent from said first cross heat exchanger and to direct a third portion of said acidic gas rich solution of sorbent to a top portion of said regenerator and another portion of said acidic gas rich solution of sorbent to a bottom portion of said regenerator;
    said flash drum is adapted to receive said second portion of said acidic gas rich solution of sorbent from said second cross heat exchanger and to direct said second portion of said acidic gas rich solution of sorbent to a mid portion of said regenerator and to direct another portion of said second portion of said acidic gas rich solution of sorbent to a bottom portion of said regenerator; and
    one or more heat pumps in communication with one or more reboilers and in communication with one or more waste heat emitters, said one or more heat pumps transfer heat obtained from said one or more waste heat emitters to said one or more reboilers.

2. The device of claim 1, further including a splitter adapted to direct utility steam to said heat pump and said reboiler.

3. The system of claim 1, wherein said splitter is adjustable to adjust the amount of utility steam provided to said heat pump and said reboiler.

4. The system of claim 1 further including at least one compressor adapted to allow a bottom portion to said regenerator to be flashed down to a pressure matching said top portion of said regenerator.

5. The system of claim 1 further including a second flash drum, said second flash drum adapted to receive said acidic gas rich solution of sorbent from said first cross heat exchanger and to direct a portion of said acidic gas rich solution of sorbent to said top portion of said regenerator and a portion of said acidic gas rich solution of sorbent to another bottom portion of said regenerator.

6. The system of claim 5 further including a multi-pressure regenerator having one or more side compressors, said one or more compressors are adapted to move gas located in said regenerator from a lower pressure section to a higher pressure section.

7. The system of claim 1 further including one or more side heat exchangers that are in communication with said absorber, said one or more side heat exchangers are adapted to receive said acidic gas solution of sorbent from said absorber and to cool said acidic gas rich solution of sorbent.

8. The system of claim 7 further including at least one compressor adapted to allow said bottom portion of said regenerator to be flashed down to a pressure matching said top portion of said regenerator.

9. The system of claim 8 further including a condenser in communication with said regenerator and adapted to receive regenerator condensate;
    a splitter adapted to receive regenerator condensate from said condenser and to direct a first portion of said regenerator condensate to said regenerator and a second portion of said regenerator condensate to a combiner; and
    said combiner in communication with said cross heat exchanger, said combiner combines regenerator condensate from said regenerator with a lean solution of sorbent from said cross heat exchanger for transfer to said absorber.

* * * * *